(12) United States Patent
Kumar

(10) Patent No.: US 11,321,680 B2
(45) Date of Patent: May 3, 2022

(54) SYSTEM AND METHOD FOR PROCESSING AND MANAGEMENT OF TRANSACTIONS USING ELECTRONIC CURRENCY

(71) Applicant: Ashish Kumar, Lewisville, TX (US)

(72) Inventor: Ashish Kumar, Lewisville, TX (US)

( * ) Notice: Subject to any disclaimer, the term of this patent is extended or adjusted under 35 U.S.C. 154(b) by 1170 days.

(21) Appl. No.: 15/498,465

(22) Filed: Apr. 26, 2017

(65) Prior Publication Data
US 2018/0315027 A1    Nov. 1, 2018

(51) Int. Cl.
*G06Q 20/06* (2012.01)
*G06Q 20/38* (2012.01)
(Continued)

(52) U.S. Cl.
CPC ..... *G06Q 20/0655* (2013.01); *G06Q 20/3274* (2013.01); *G06Q 20/3276* (2013.01); *G06Q 20/3278* (2013.01); *G06Q 20/3823* (2013.01); *G06Q 20/3825* (2013.01); *G06Q 20/3827* (2013.01); *G06Q 20/3829* (2013.01); *G06Q 20/401* (2013.01); *G06Q 40/12* (2013.12);
(Continued)

(58) Field of Classification Search
None
See application file for complete search history.

(56) References Cited

U.S. PATENT DOCUMENTS 8,700,729 B2 * 4/2014 Dua ..................... H04L 63/08
709/217
9,735,967 B2 * 8/2017 Leggette ............... G06F 3/0653
(Continued)

FOREIGN PATENT DOCUMENTS

AU    2016262999 A1 * 11/2017 ......... G06Q 20/3676
JP    2011108274 A  * 10/2001 ......... G06Q 20/1235

OTHER PUBLICATIONS

Fergal Reid, Martin Harrigan. An Analysis of Anonymity in the Bitcoin System. 2011 IEEE International Conference on Privacy, Security, Risk, and Trust, and IEEE International Conference on Social Computing. https://ieeexplore.ieee.org/stamp/stamp.jsp?tp=&arnumber=6113303. (Year: 2011).*

(Continued)

*Primary Examiner* — El Mehdi Oussir

(57) ABSTRACT

A method and system for securely processing and managing electronic transactions using one or more electronic currencies. The method and system of the present invention comprise a mechanism for device entities to engage in a financial transaction and process the transaction electronically without being connected to any remote communication link at the time of transaction; any one participating entity of the transaction to submit transaction to a central controller for settlement at any time after the transaction initiation; electronic transaction requiring exchange of electronic currency; electronic currency also being available in physical as well as multiple denominations with localization feature; both electronic transaction and electronic currency to be validated and verified securely through at least one central controller consisting of a central processing unit, operating system software to run the central processing unit and data storage means to identify at least transacting device entities, currency attributes and transaction attributes.

8 Claims, 16 Drawing Sheets

(51) Int. Cl.
  *G06Q 40/00* (2012.01)
  *G06Q 20/32* (2012.01)
  *G06Q 20/40* (2012.01)
  *H04L 67/306* (2022.01)
  *H04L 29/06* (2006.01)

(52) U.S. Cl.
  CPC ........ *H04L 63/0442* (2013.01); *H04L 63/062* (2013.01); *H04L 67/306* (2013.01)

(56) References Cited

U.S. PATENT DOCUMENTS

| | | | | |
|---|---|---|---|---|
| 10,354,249 B2* | 7/2019 | Xu | | G06Q 20/382 |
| 10,528,944 B2* | 1/2020 | Khan | | H04W 12/068 |
| 11,070,535 B2* | 7/2021 | Basin | | H04L 9/3242 |
| 2004/0034771 A1* | 2/2004 | Edgett | | G06Q 20/14 |
| | | | | 713/168 |
| 2013/0061049 A1* | 3/2013 | Irvine | | G06F 21/6218 |
| | | | | 713/165 |
| 2014/0143126 A1* | 5/2014 | Malik | | G06Q 40/025 |
| | | | | 705/38 |
| 2014/0281497 A1* | 9/2014 | Medvinsky | | H04L 9/0825 |
| | | | | 713/156 |
| 2015/0235290 A1* | 8/2015 | Boemi | | G06Q 20/10 |
| | | | | 705/26.43 |
| 2016/0012465 A1* | 1/2016 | Sharp | | G06Q 20/10 |
| | | | | 705/14.17 |
| 2016/0379213 A1* | 12/2016 | Isaacson | | G06F 3/048 |
| | | | | 705/44 |
| 2017/0245146 A1* | 8/2017 | Rolfe | | G06Q 20/3226 |
| 2018/0047079 A1* | 2/2018 | Boemi | | G06Q 20/322 |
| 2018/0053157 A1* | 2/2018 | Roffey | | G06Q 20/36 |
| 2018/0082294 A1* | 3/2018 | Davis | | G06Q 10/00 |
| 2018/0173891 A1* | 6/2018 | Wang | | H04L 63/083 |
| 2018/0205725 A1* | 7/2018 | Cronkright | | H04L 63/0838 |
| 2019/0213318 A1* | 7/2019 | Gnanasekaran | | H04W 12/06 |
| 2020/0358614 A1* | 11/2020 | Fiske | | H04L 9/3228 |

OTHER PUBLICATIONS

J. Szeferand R. B. Lee, "BitDeposit: Deterring Attacks and Abuses of Cloud Computing Services through Economic Measures," 2013 13th IEEE/ACM International Symposium on Cluster, Cloud, and Grid Computing, 2013, pp. 630-635, doi: 10.1109/CCGrid.2013.102. (Year: 2013).*

* cited by examiner

SYSTEM AND METHOD FOR PROCESSING AND MANAGEMENT OF TRANSACTIONS USING ELECTRONIC CURRENCY

CROSS-REFERENCE TO RELATED APPLICATIONS

This application claims the benefit of U.S. Provisional Application No. 62/328,281, filed Apr. 27, 2016.

BACKGROUND OF THE INVENTION

Field of the Art

The method and system of the present invention relate to the field of communication between devices for conducting financial transactions. More particularly the method and system of the present invention relate to the field of conducting financial transactions using secured processing of transaction data using electronic currency as a medium in a hybrid model of centralized and de-centralized electronic processing.

Discussion of the State of the Art

Economists define "money" (also referred to as the money supply) as anything that is generally accepted in payment for goods or services or in the repayment of debts. Cash currency in the physical form, for example dollar, euro and coins et cetera, clearly fits this definition and is one type of money. An important aspect of a currency is its ease of availability and ease of use for the purpose of financial exchange whenever needed and wherever needed for payment. Another important feature of most currencies is the centralized nature of their respective issuing authorities. Still another important feature of a currency is the commonly accepted and agreed upon value of the currency between the parties that are involved in a financial transaction.

The main aspect of a financial transaction involves crediting the money from one account and debiting the money in the second account. The amount of money credited and debited depends on the underlying currency used for the purpose of withdrawal of funds and deposition of funds respectively. Wherein withdrawal currency is the accepted form of payment by the payer and deposited currency is the accepted form of payment by the payee. Thus currency is one of the many representations of money. A currency can be in the electronic form too.

Though with the advancement in technology, the form of financial transaction has evolved and credit cards, debit cards, gift cards and mobile phones can now be used instead of traditional in-person exchange of currency for conducting transaction. However one problem with the existing electronic financial transaction systems is that they require a real-time communication with the payment processor wherein the payer device, the payee device or both devices need to be connected to the centralized processor via Internet or another communication link for processing the transaction. Thus at least one of the payer or payee devices is required to have an electronic connection for remote communication even though the transaction is taking place between the payer and payee devices. The reason for this connectivity requirement is that the payer's account information needs to be validated by logging into the remote account of the payer to access and verify the availability of money in the payer's account. In remote parts of the world where there is no Internet, merchants either do not accept credit/debit cards or take an impression of the card to submit for processing and settlement at a later time via postal mail or courier. However, that method is highly insecure due to the risk of misuse and misplacement of the card's vital information.

Similarly, there are multiple problems that are associated with cash currency transactions such as carrying the currency physically with a possibility of getting lost or stolen, carrying currencies of various denominations, carrying currencies from different issuing authorities et cetera. Some electronic currencies also exist, such as Bitcoin, which are not physical currencies but all of them require a network connection to process a financial transaction between any two parties. Bitcoin specifically has its own deficiencies where it can be created (or minted) by any person as long as that person has the required hardware equipment and software. So there is no central authority that guarantees either the value or the availability of a Bitcoin in case of any problem with the transaction or the parties associated with a transaction.

So there exists a need for an electronic transaction processing system where an electronic device securely but locally maintains a current snapshot of the money held by the payer in a specific account. Such system will allow the transaction processing to take place anywhere and at any time locally between the payer device and payee device similar to cash currency transaction or a gift card transaction while simultaneously overcoming the problems of cash currency transaction by establishing the confidentiality, integrity, authenticity and non-repudiability of the counterparties in a financial transaction and the transaction itself.

Another problem with existing electronic currencies, such as Bitcoin, is that these electronic currencies do not provide localization. It is well known that same goods and/or services cost different amount of money in different parts of the word and the cost in local currency is not equivalent to the cost in another currency. Also merchants may not be aware of the currently prevailing exchange rates on a regular basis. For example a local merchant in a remote village of India may not know what the currently prevailing Bitcoin-Rupee or Dollar-Rupee exchange rate is. However, merchants or payees need to provide the required payment information for electronic currency by first converting local currency, such as Dollar or Indian Rupee, into equivalent electronic currency amount, such as Bitcoin. This problem becomes even worse if the merchant has to list the price of same good, service or merchandise into two or more different currencies. One more problem with such multiple listing amounts is the variation in the exchange rate from electronic currency to cash currency and vice-versa so the merchant has to track and update the prices quoted in different currencies on a regular basis.

So there exists a need for an electronic currency that also contains localization information that allows it to have one-to-one mapping to locally accepted cash and other currencies and a central system that automatically tracks the exchange rates applicable at the time of transaction to make any required conversions in the value of localized electronic currency from one localization to another localization.

Still another problem with electronic payment transaction is that the cost of transaction itself is high because each transaction is processed individually end-to-end. For example, a payment using a credit card requires the transaction to be submitted to a payment gateway, payment gateway then forwards the transaction to payment processor of the payee's account holder (acquiring bank), payment processor then forwards the transaction to the card association, card association then forwards the transaction to the issuing bank, issuing bank authorizes the transaction and sends a response back along the same route to allow or deny the transaction. Because of this multi-hop and multi-party process the transaction costs are high and there exists an increased risk of transaction failure due to communication link failure at any hop within the communication network chain.

Further, to settle the transaction, the payee then submits all approved transactions to the payee's account holder for settlement using batch processing via payment processor, payment processor submits the batch request to the issuing bank and issuing bank then deposits money to the acquiring bank. This settlement period adds another delay in the final completion of the transaction and disbursement of money from payer's account to the payee's account. The existing variants of transaction processing system were implemented when data processing power required large computers that could be installed only at big physical locations. But today's mobile electronic devices hold more memory and computational processing power than big mainframe systems of just a decade ago. The higher transaction costs associated with this multi-party model are either born by the payer entity, by the payee entity or both entities.

Therefore, there exists a need to minimize the number of counterparties in an electronic transaction to reduce the costs and also minimize the delay and risk of transaction failure by minimizing the number of interconnections and device connectivity requirements. Today's electronic devices that have enough memory and data processing capabilities to securely process and complete the transaction locally between the transacting devices; and synchronize with the central computer at a more convenient time later for settlement. Also the settlement time can be reduced since the transaction has already been validated, authenticated, confirmed and verified locally between the transacting devices.

Another problem with current transaction processing systems is that the transaction processing incorporates single-factor (such as credit card swipe) or two-factor (such as debit card with PIN or Apple Pay™) transaction approval. But it does not allow a remote third device or three or more factor approval process to control the outcome of transaction between the first and second device. While some cards allow alerts to be sent to multiple devices after the transaction is processed but they do not allow other users to control the transaction processing remotely. Also, each transaction processing exchange acts as an escrow agent for those funds, while trades are performed within the system. Those large amounts of electronic currencies, pooled and kept in central locations, attract the attention of hackers and thieves alike. Despite high security measures taken by the exchanges to protect their plurality of accounts, their servers are frequently subject to cyber-attacks, or internal heists. Therefore, a transaction processing system should allow its users to register another user or another device for approving a transaction even if the transaction was initiated by the first device on their behalf. For example, such a system would allow a father to receive a transaction request and approve the transaction from his mobile device remotely even if the transaction was initiated by his daughter on a separate device held by the daughter in a shopping mall.

Still another problem with today's transaction processing systems is the lack of aggregation for the settlement purpose. So if an 'Entity A' buys a product for $500 from another 'Entity B' and then 'Entity B' buys a different product for $400 from 'Entity A' before the settlement time then instead of settling two individual transactions between 'Entity A' and 'Entity B', system should settle a single payment transaction of $100 from 'Entity A' to 'Entity B'. This problem becomes even more pronounced if the local currency for 'Entity A' and 'Entity B' are different. In that case, the payment is converted into local currency for both transactions rather than a single final transaction. This increases the overall per transaction cost for both entities as well. Furthermore, the currency exchange and local currencies are susceptible to counterfeit currency and availability issues.

Hence, there exists a need for a system and method that allows each individual entity in the system to process the transaction locally with another entity without necessarily being connected to a communication link or Internet while allowing entities to settle the transaction at a later time using a central controller. Furthermore, the central controller aggregates the payment transactions for each individual transacting entity itself during the final settlement. This system should allow the transactions to be processed using an electronic currency wherein electronic currency also contains localization information and can be converted to and from into any local currency seamlessly. This system should also allow an entity to register another registered device or entity to receive alerts and approve the transaction on behalf of that entity.

Furthermore, the system should allow validation and verification of the currency, transaction amount and counterparties to the transaction using the individual device entities associated with the transaction and a central controller.

There also exists a need for a system where each party involved in a financial transaction can be validated by the other party before initiating the transaction to ensure that the information provided by each party can be trusted and is secure.

Such a transaction processing system should not require each transaction to be processed remotely while at the same time each entity can have a secure and up-to-date snapshot of the money available in its account. The system ensures the legitimacy of each entity by storing their profile with certain attributes (e.g. payment cards, bank accounts, purchase history, customer reviews etc.) and also a hash of each transaction consummated by each entity so that the transactions can be settled by synchronizing the local information maintained by the device with the information maintained by the central controller. Such a system provides a secure and confidential environment to all entities using electronic currency so that entities can perform financial transactions with each other.

The applicant is unaware of the existence of any such method and system to manage and process the transactions using a localizable electronic currency that contain the above features and address the above described shortcomings in the prior art. More specifically, there is no such computer-based system and method known in the prior art that allows two entities to complete a transaction electronically using an electronic currency when both entities are not connected to the Internet but can only communicate with each other on a peer-to-peer basis. Furthermore, no such system exists where two entities can have multiple individual transactions with each other but the central controller aggregates all individual transactions and minimizes the number of individual transactions for each entity. Also, no existing system provides a method for the electronic transaction approval where a remote third entity can be designated as the transaction approver. Furthermore, no such system exists to establish the validity, authenticity and non-repudiability of the transaction, counterparties of the transaction and the electronic currency used in the transaction without either transacting entity being connected to a central payment processor at the time of the transaction.

SUMMARY OF THE INVENTION

Accordingly, the inventor has conceived and reduced to practice, in a preferred embodiment of the invention, a computer-based method and system for a secure and confidential interaction between plurality of device entities so that an entity can complete a financial transaction with another entity using a localizable electronic currency. Another objective of the present invention is to provide a method to the device entities that enables them to complete a transaction locally on a peer-to-peer basis and without necessarily being connected to a communication link or Internet while allowing entities to settle the transaction at a later time using a central controller. Still another objective of the present invention is to establish a mechanism to quantify the availability of money for each entity and updating that availability based on the transaction information. Still another objective of the present invention is to provide a method to the device entities that enables them to complete a transaction using an electronic currency wherein such electronic currency also contains localization information thus allowing devices to list the prices and pay using the benefits of differential pricing associated with geographical and economic differences of regions. Still another objective of the present inventions is to provide the mechanism to verify the validity of the currency itself using a central controller. Also, one more objective of the current invention is to provide a method for the electronic transaction approval where a remote third entity can be designated as the transaction approver. Another objective of the present invention is to establish the validity, authenticity and non-repudiability of the transaction, counterparties of the transaction and the electronic currency used in the transaction without either transacting entity being connected to a central payment processor at the time of the transaction.

The present invention introduces novel method and system of devices having a program and circuitry for initiating and completing a financial transaction between a payer device and a payee device; payer and payee device exchanging the information to establish trust, security and confidentiality of information exchange; payer device to validate the availability of funds for the transaction upon receiving the request to initiate a transaction; payer and payee device to exchange the transaction information using a mechanism to exchange information where such mechanism may involve direct communication link such as Bluetooth, Near-field communication or another communication link or a device camera and device screen when no such communication link can be established; optionally payer device establishing a communication link with a third registered approver device; payer, payee and optional approver device to create a unique transaction crypto token comprising of information of the device identifiers, transaction amount, timestamp and other identifiers; storing the crypto token locally until the transaction is synchronized with the central controller; and finally central controller transferring the electronic currency from the payer account to payee account when either of the three devices involved in the transaction synchronizes and checks-in the stored transaction data containing crypto token and other information. The present invention thus provides a mechanism for the payer device and payee device to conduct an electronic transaction using electronic currencies without the need for either device being connected to the Internet or another communication to a network of peer devices at the time of transaction.

Additionally, this invention allows any device entity to complete the financial transaction using an electronic currency where such electronic currency also contains localization information for different regions and fixed smaller denominations of the electronic currency. Furthermore, this invention provides method and system for verifying the validity of physical currency before it is converted into electronic currency.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

Figure 1:
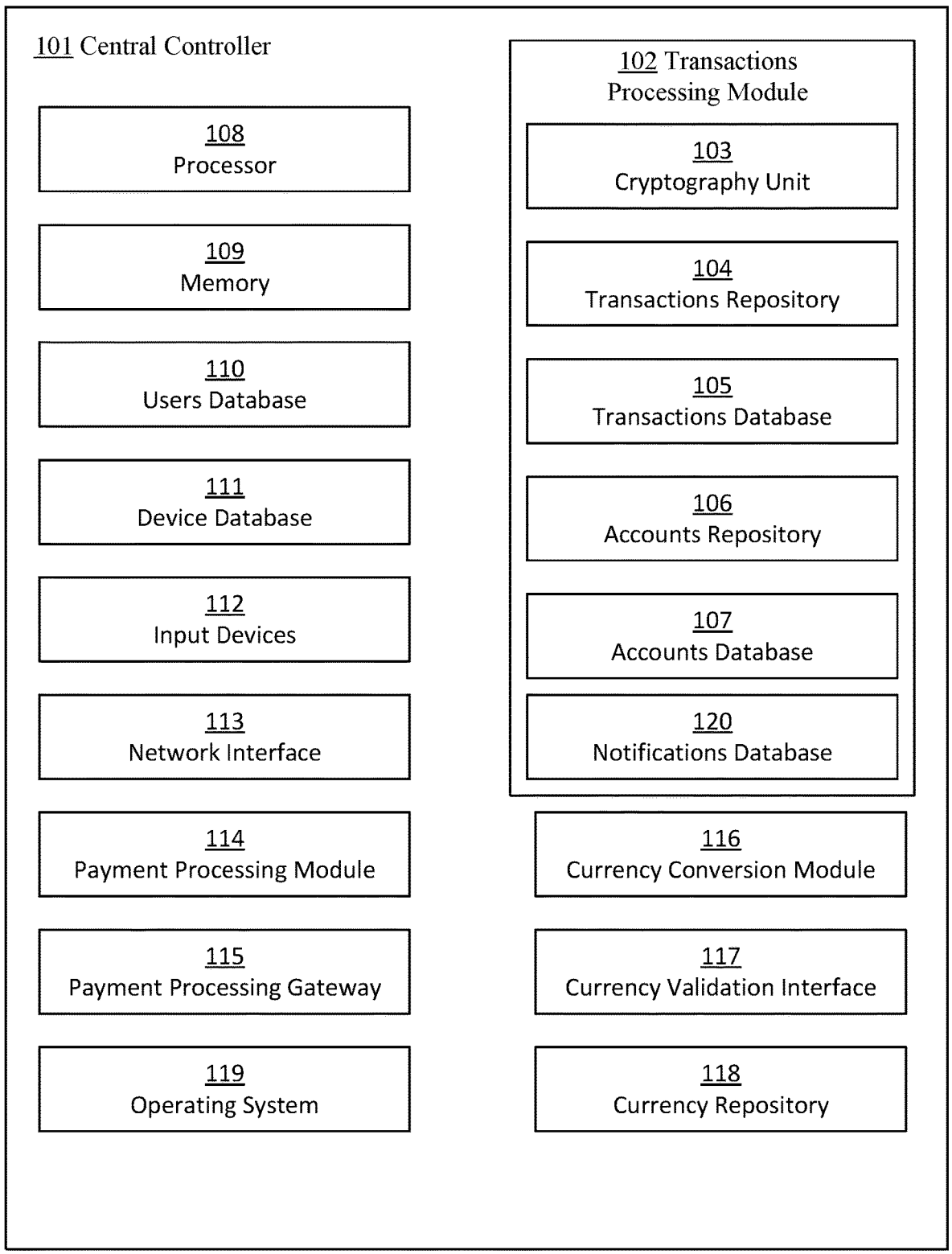
FIG. 1 is a block diagram showing one embodiment of the central controller.

The figures are described in greater detail in the next section of the patent.

DETAILED DESCRIPTION

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein the following terms have the meaning given below:

"Transaction"—means a transfer of certain amount of money or funds from one account to another account.

"Device" or "Device entity"—means any entity that participates in a transaction. This entity may register itself with the central controller. Upon registration, central controller will verify the entity and assign an identification code to the entity.

"Payer"—means any entity that wants to pay a certain amount for the product and/or service and submits the request for initiating a transaction to the central controller. This entity may register itself with the central controller. Upon registration, central controller will verify the entity and assign an identification code to the entity.

"Payee"—means any entity that wants to receive a certain amount for the product and/or service and is a beneficiary of the request for a transaction. In certain embodiments a payee can also submit a request to initiate a transaction to the central controller. This entity may register itself with the central controller. Upon registration, central controller will verify the entity and assign an identification code to the entity.

"Payer device"—means any computer device for a payer to interface to at least one controller. This may be, but not limited to, user terminals comprising a computer and browser can be any such device as a typical computer, WebTV et cetera that can connect to a network, a portable device be any of the various types of devices such as laptops, smartphones, PDAs or any other device capable of communicating over a network.

"Payee device"—means any computer device for a payee to interface to at least one controller. This may be, but not limited to, user terminals comprising a computer and browser can be any such device as a typical computer, WebTV et cetera that can connect to a network, a portable device be any of the various types of devices such as laptops, smartphones, PDAs or any other device capable of communicating over a network.

"Transaction Processing Module" or "Client Application"—means a set of instructions stored in the memory of a computer device. The instruction set performs computations, validations and processes the business logic to handle the processing of a financial transaction.

"Currency"—means a mutually acceptable payment format between the payer and payee for goods or services or in the repayment of debts.

"Electronic currency"—means that the currency can have certain attributes that can be validated by an electronic system and it can be used for payments and transactions using an electronic system. It is possible to have a physical counterpart to an electronic currency where the funds of physical currency can be easily transferred into an electronic system and an electronic system can interface with a physical dispenser to dispense physical currency.

"Token" or "Key" or "Cipher" or "Cryptographic Key"—means a unique sequence of digital information used by a device to transform another piece of information in a secure, deterministic and verifiable way.

"Encryption" means using a key or cipher to convert a piece of information into scrambled information so that the original information can be transferred securely.

"Hash" or "Hash value", also called a message digest, is a value returned by a hash function that can be used to map data of arbitrary size to data of fixed size. The hash is substantially smaller than the original data itself, and is generated by a formula in such a way that it is extremely unlikely that some other data string will produce the same hash value.

"Repository" refers to a storage that records the information about the data including the time when the original information was modified and what modification itself was made.

"Check-in"—means submitting the changes made in the original data to a repository.

"Check-out"—means a retrieving the latest data from a repository or specifying the time of a data snapshot that is being retrieved.

"Secure redemption token" or "Token"—means an identifier or code that is generated after validating that the payer, payee and optional approver devices involved in a transaction. Such a code satisfies the necessary and sufficient condition for identifying a transaction through the central controller. Token also identifies the terms and conditions of the transaction as set forth in the payment request. Such conditions may include the validity period for the token, location of the transaction, currency of the transaction, amount of the transaction etc.

"Central controller" or "Controller"—means, in a preferred embodiment, an entity comprising a network-connected controller computer comprising at least a processor and a storage device further comprising a program stored in the storage device and operating on the processor, the program adapted to implement a system and method for managing interaction between a plurality of payer devices and a plurality of payee devices. This entity, in a preferred embodiment, may have manual and/or automated operation using a computer system and/or web server. Such an entity may also be a single entity or a distributed entity as deemed fit by a particular embodiment.

DETAILED DESCRIPTION OF EXEMPLARY EMBODIMENTS

This invention may involve novel methods, system, message formats, and data structures for a buyer-initiated bid offer request and response management system. The following description is presented to enable one skilled in the art to make and use the invention, and is provided in the context of particular applications and their requirements. Various modifications to the disclosed embodiment will be apparent to those skilled in the art, and the general principals set forth below may be applied to other embodiments and applications. Thus, the present invention is not intended to be limited to the embodiments shown and the inventor regards this invention as any patentable subject matter described herein.

A preferred embodiment of the invention consists of a central controller that processes the settlement of transactions among the payer devices to the payee devices. In the preferred embodiment of this invention payer and payee devices communicate with the central controller using an electronic network.

Example 1

A typical central controller 101, as shown in FIG. 1, can be a high-speed computer containing a central processing unit ("CPU") 108, operating system 119, RAM 109, transaction processing module 102, and network interface 113. CPU 108 may be a 3.2 GHz Intel Core i7 microprocessor manufactured by, for example, Intel™ Inc. Application server 208 can be a Java™ Application Server using Java™ Platform, Enterprise Edition or .NET™ Server developed by Microsoft™. Application server runs a customized software application for processing and handling of bid offer requests, responses and transaction messages in the present invention using a software-based transaction processing module 102, input devices 112, network interface 113 and payment processing module 114.

Transaction processing module 102 contains a cryptography unit 103 that generates, assigns, stores and maintains the validity time period of the public and private cryptographic keys for all the registered devices. Data storage devices 105, 107, 110 and 111 may contain databases used in the processing of transactions and managing the accounts, money in each account and transaction messages of various embodiments of the present invention. Notifications database 120 is used to store any pending notifications and messages for the user devices 201 that are delivered to the associated user device 201 when the device connects to the central controller 101 through the network interface 113. The notifications and messages can be used to convey the account information and transaction information between the central controller 101 and user devices 201.

Figure 13:
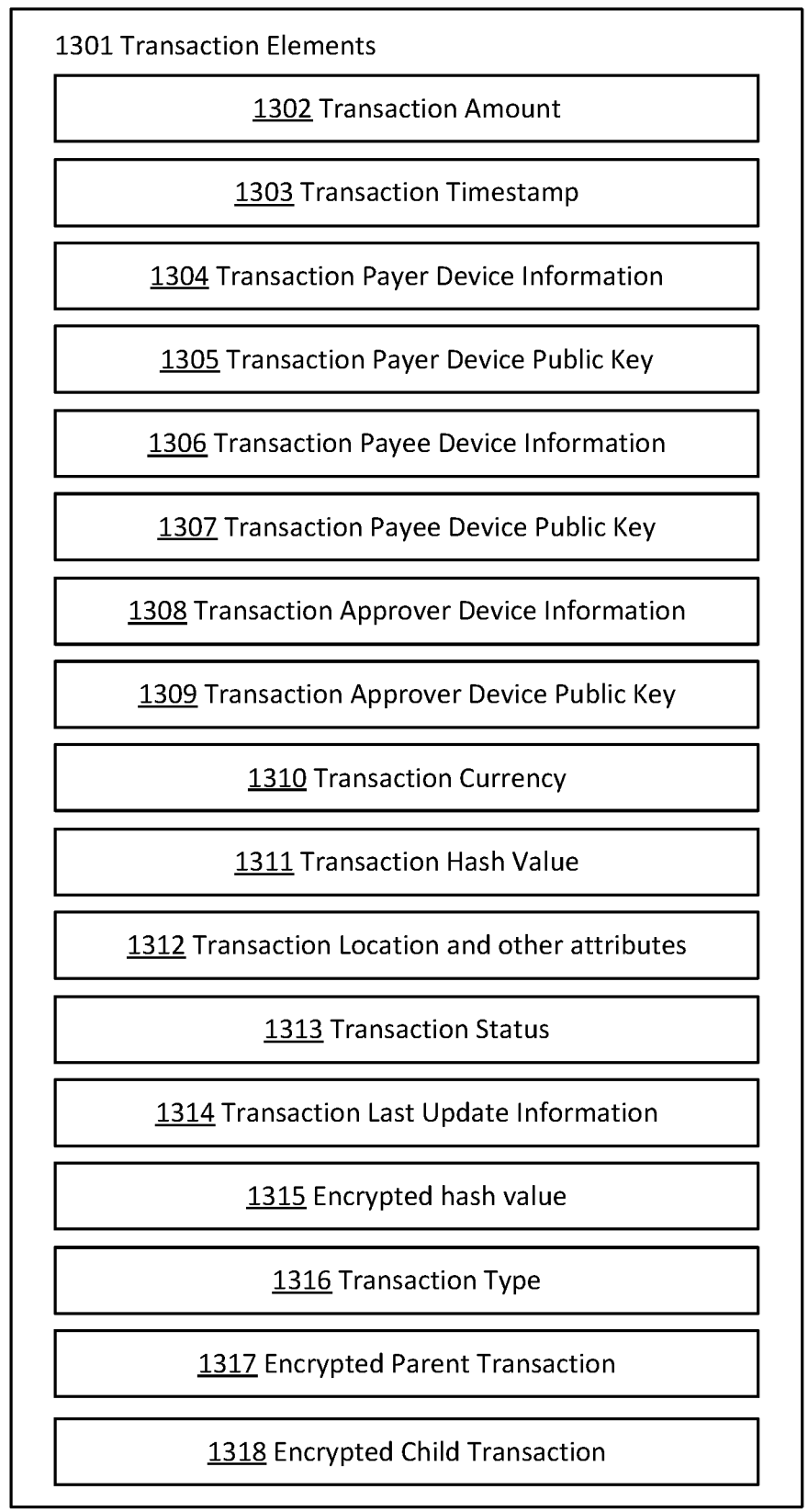
FIG. 13 shows exemplary information elements associated with both digital and physical for of the electronic currency that can be verified before the amount is converted into data format and the corresponding amount is transferred into the account of a device entity.

Transactions database 105 may contain data attributes for various transactions including the transaction identifier, timestamp, payer, payee, amount and currency of the transaction etc. FIG. 13 shows attributes of a transaction itself as stored in the transactions database.

Accounts database 107 may contain data attributes for each account associated with one or more devices wherein account information includes the availability of money or funds for various currency types as applicable for each account, account identifier, account holding user's information, account approver's information etc.

User database 110 may contain information about each user including user name, password, a user identifier, associated accounts, associated devices etc.

Device database 111 may contain information about each device including a device identifier, associated user, associated accounts, public and private key associated with the device etc.

Transaction repository 104 may contain attributes for all system generated transactions and transaction token codes such as associated payer device identifier, payee device identifier, transaction description, validity period, detailed final transaction agreement, transaction amount, transaction currency and timestamp etc.

Currency conversion module 116 operates with transaction processing module 102 and Payment Processing Module 114 to apply the currency conversion rules as maintained by currency repository 118 and calculates the amount of money to finally withdraw or deposit into the account maintained by each device.

Figure 3:
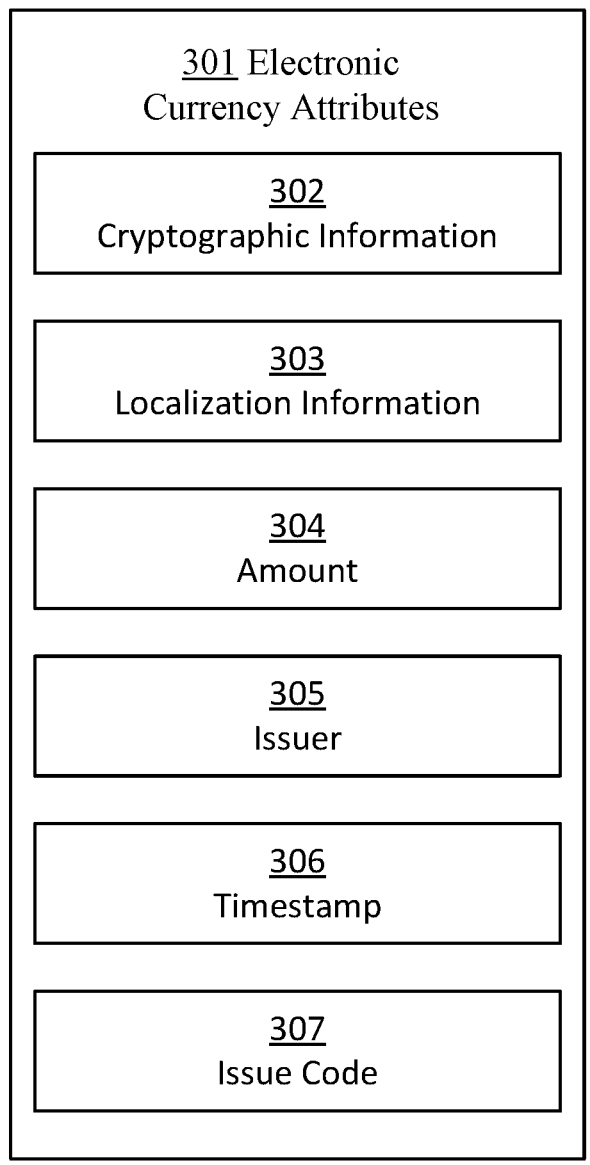
FIG. 3 shows one embodiment of the information elements contained in electronic currency used to process the electronic transaction.

Currency validation interface 117 allows converting physical form of currency into electronic currency after validating the physical currency information and mapping it to the electronic currency information elements. FIG. 3 shows attributes of the electronic currency as used by the system.

Payment processing module 114 interacts with transaction processing module 102 to settle all the transactions by aggregating the amounts, apply any required currency conversion and deposit or withdraw money from an account. Payment processing gateway 115 may interface with the system of other financial institutions or other vendors to receive the payments and make the payments from and to those other external entities as needed.

While some embodiments may describe the central controller 101 as a single computer, those skilled in the art will realize that the functionality can be distributed over a plurality of controller computers. As such some application server software components may reside within device entities 201a or device 201b et cetera as shown in FIG. 4.

Figure 2:
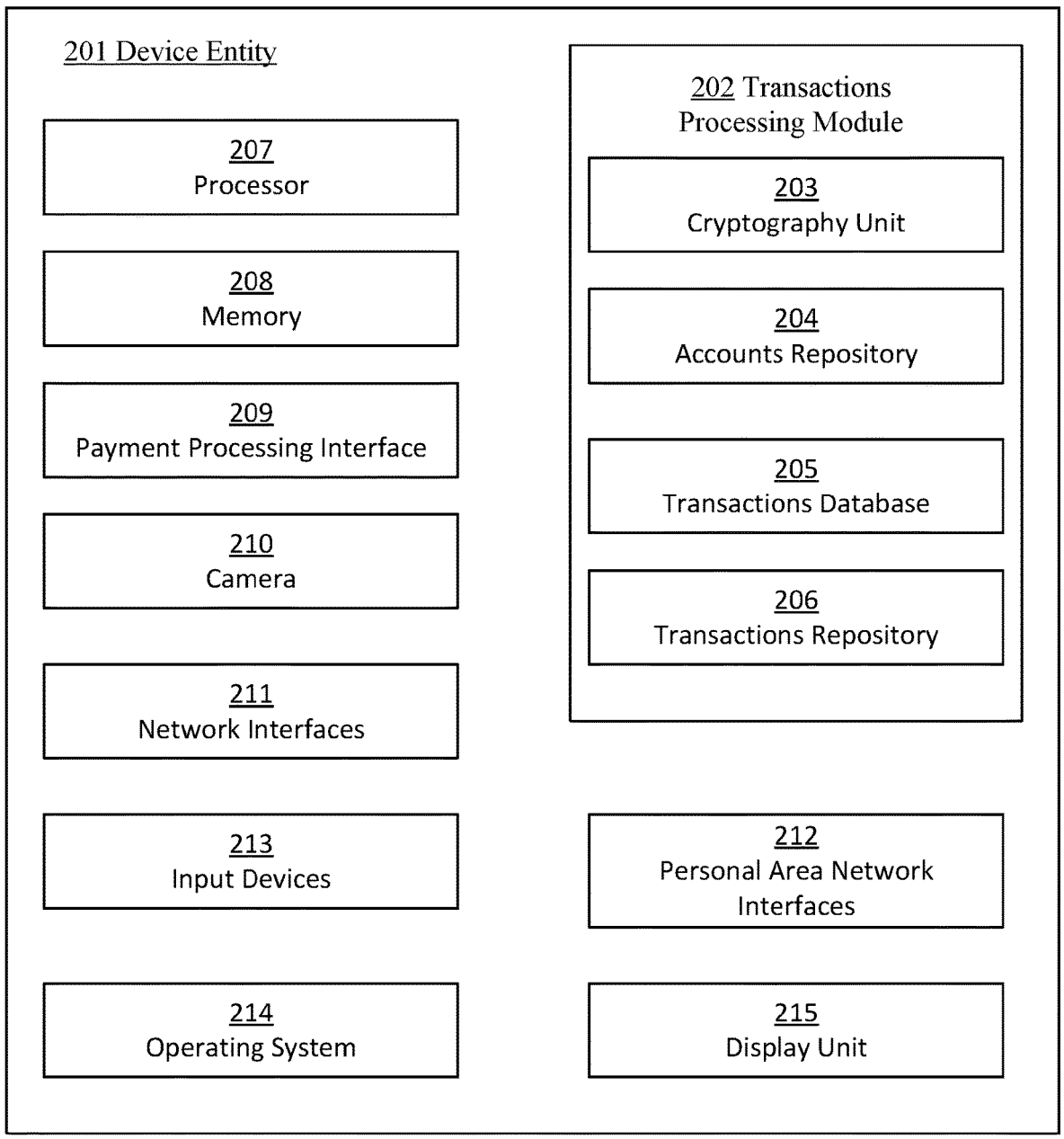
FIG. 2 is a block diagram showing one embodiment of the device entity involved in the electronic transaction.

A typical device entity 201, as shown in FIG. 2, can be a mobile electronic device, a laptop computer or a handheld personal digital assistant etc. containing a central processing unit ("CPU") 207, RAM 208, transaction processing module 202, and input devices 213. A device entity can have multiple input devices 213 such as a touchscreen, a keyboard, a finger print reader and in some cases camera 210 itself is an example of input device where it can be used as a face recognition device, a retina reader etc. Device entity 201 also contains network interfaces 211 for remote connections using a direct link such as Ethernet or a wireless link to access the Internet, network interface 212 to establish Personal Area Networks with nearby devices using technologies such as Bluetooth, Near Field Communication etc. In some instances, camera device 210 can also be used to interact with another device locally by scanning and interpreting the information from another device for the transaction purpose. The device 201 also contains a display unit 215 to display data presented either by the operating system 214 or the transactions processing module 202. The operating system 214 is the program that manages the interaction between various components of the device 201. In a preferred embodiment of the current invention, the transaction processing module 202 manages the interaction between various components of the device 201 for the purpose of transaction processing using the method described in this specification.

Payment processing interface 209 interacts with the payment processing module 114 of the central controller 101 to send and receive payment information into the account managed by the device. Transaction processing module 202 contains a cryptography unit 203 that creates and stores the public key as provided by the central controller for the devices with further capability of encrypting and decrypting data using those keys as well as computing hash value for the information contained in account repository 204 and transaction repository 206. Data storage devices 205 may contain database used in the processing of transactions and managing the accounts, money in each account and transaction messages of various embodiments of the present invention.

Figure 4:
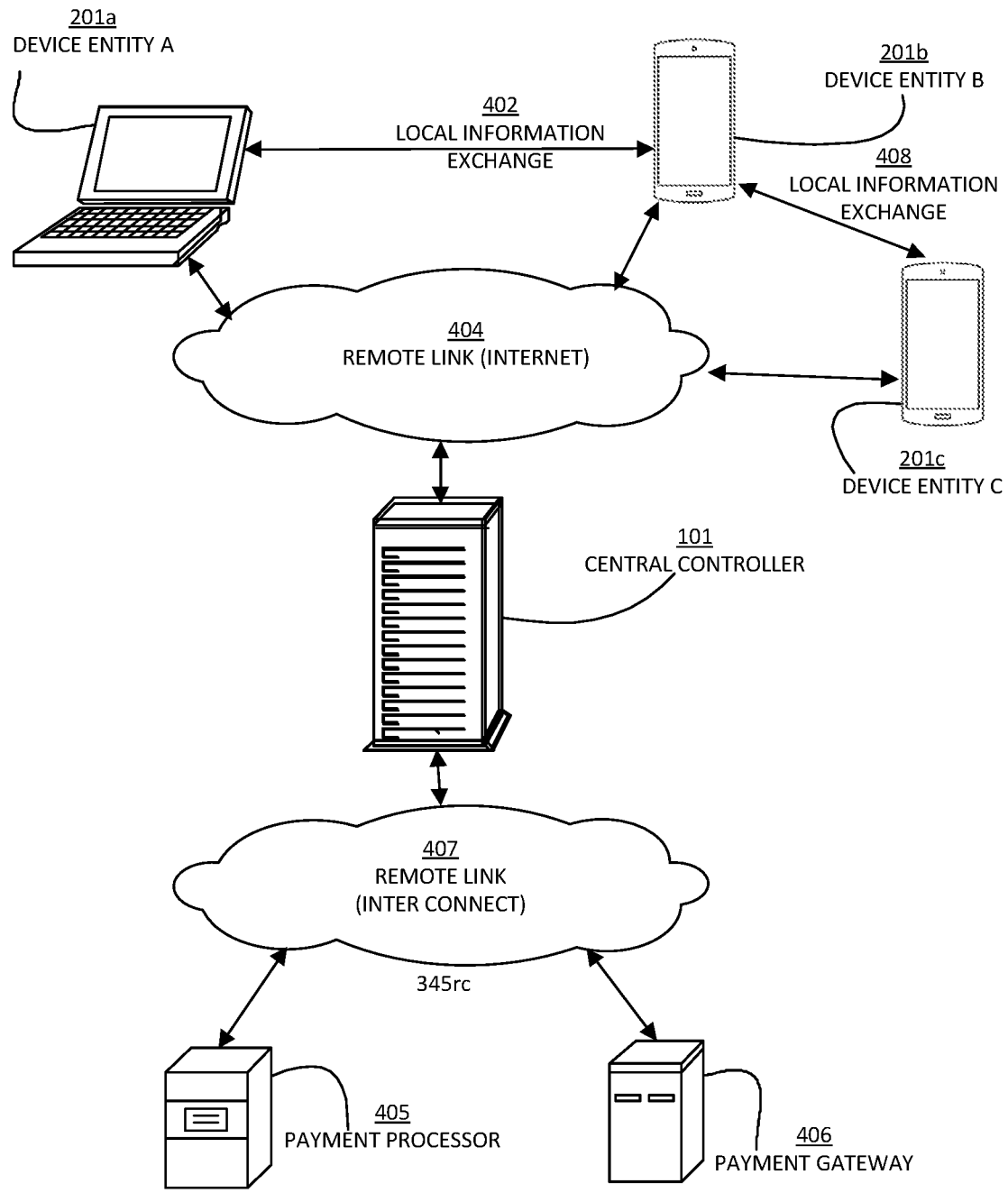
FIG. 4 shows the preferred embodiment of the overall system architecture.

An overall diagram of one exemplary embodiment of the invention is shown in FIG. 4. In general the system architecture connects device entities 201a, 201b etc. with for the purpose of commencing a transaction locally and settling it later using a central controller 101. Device entities connect to the central controller 101 via a network 404. There can be many device entities 201; however, the actual number of device entities is not relevant so long as there is at least one payer device entity 201a and one payee device entity 201b. Device entities 201 may use different online and offline communication interfaces to communicate with each other and central controller 101. Typically, but not necessarily, communication is handled via a network, for example, the Internet.

Device entities 201a, 201b may be any such device as a typical computer, WebTV, et cetera, that can connect via a remote network interface 211 in FIG. 2 to access a network, for example, the Internet. Payer 201a connects to the central controller 101 via a webpage interface and payee 201b connects to the central controller via a communication link. The connection between device entities and central controller server may be a secured connection using Transport Layer Security (TLS), Secure Socket Layer (SSL) or any other such cryptographic protocol that provides communication security over a network, for example, the internet.

Central controller 101 may also connected to the internet via an ISP. Similarly payer and payee portable electronic device 201a, 201b may be any of the various types of devices such as laptops, smartphones, PDAs or any other device capable of communicating over a network, for example, the internet.

Payer, payee and/or controller can communicate by sending and receiving a byte stream over the electronic communication channel using, for example, Transmission Control Protocol (TCP) and/or User Datagram Protocol (UDP) over Internet Protocol (IP), etc. Such electronic communication channel may consist of a wired connection, for example, using a telephone line, Digital Subscriber Line (DSL), Wireless (using 802.11a/b/g or WiMAX etc.), cellular (Code Division Multiple Access 'CDMA' or General Packet Radio Service 'GPRS etc.), or any other like communication channel.

Although not shown in FIG. 4, payer and payee entities can also communicate with central controller using, for example, SMS (Short Message Service), MMS (Multimedia Message Service), postal mail, electronic mail, facsimile and/or other such offline communication channels. Payer device 201a can also present a transaction identifier using an encoding scheme like QR Code (Quick response code) on its screen and the payee device 201b can scan the code using the device camera and submit it for processing to the central controller 101. The lines in FIG. 4 therefore represent logical information flow and not the physical connections.

An Example of Electronic Currency

FIG. 3 shows attributes included in an electronic currency 301 as used by the processing of transaction by the device entities 201 and controller 101. Field 302 in FIG. 3 is data containing information related to the cryptographic keys used by the currency issuing agent or the central controller 101 itself, hash value of currency information et cetera; Field 303 is the data used to localize the currency and adjust its value based on the geographic region where currency is being used or the geographic region specified by the payer, payee devices etc.; Field 304 is the amount of money the currency is equivalent to and is particularly important if the currency is in physical form where fixed denominations of the currency are needed. Field 305 contains the information regarding the issuing authority of the currency. Field 306 is a timestamp information record that records the issuing time, update time etc. related to the currency. Field 307 is the issue code of the currency to uniquely identify the physical form of the currency for validation and verification purpose before currency data can be loaded into the system for transaction purpose. All this information can be encrypted and stored with the currency information when new currency is created by the issuing authority. In the physical form of the currency, issuing authority can encode this information in the form of a QR code or any other such mechanism and display it on the currency. The attributes included in the electronic currency are shown as an example only and other such attributes can be used in another embodiment of the present invention.

Figure 16:
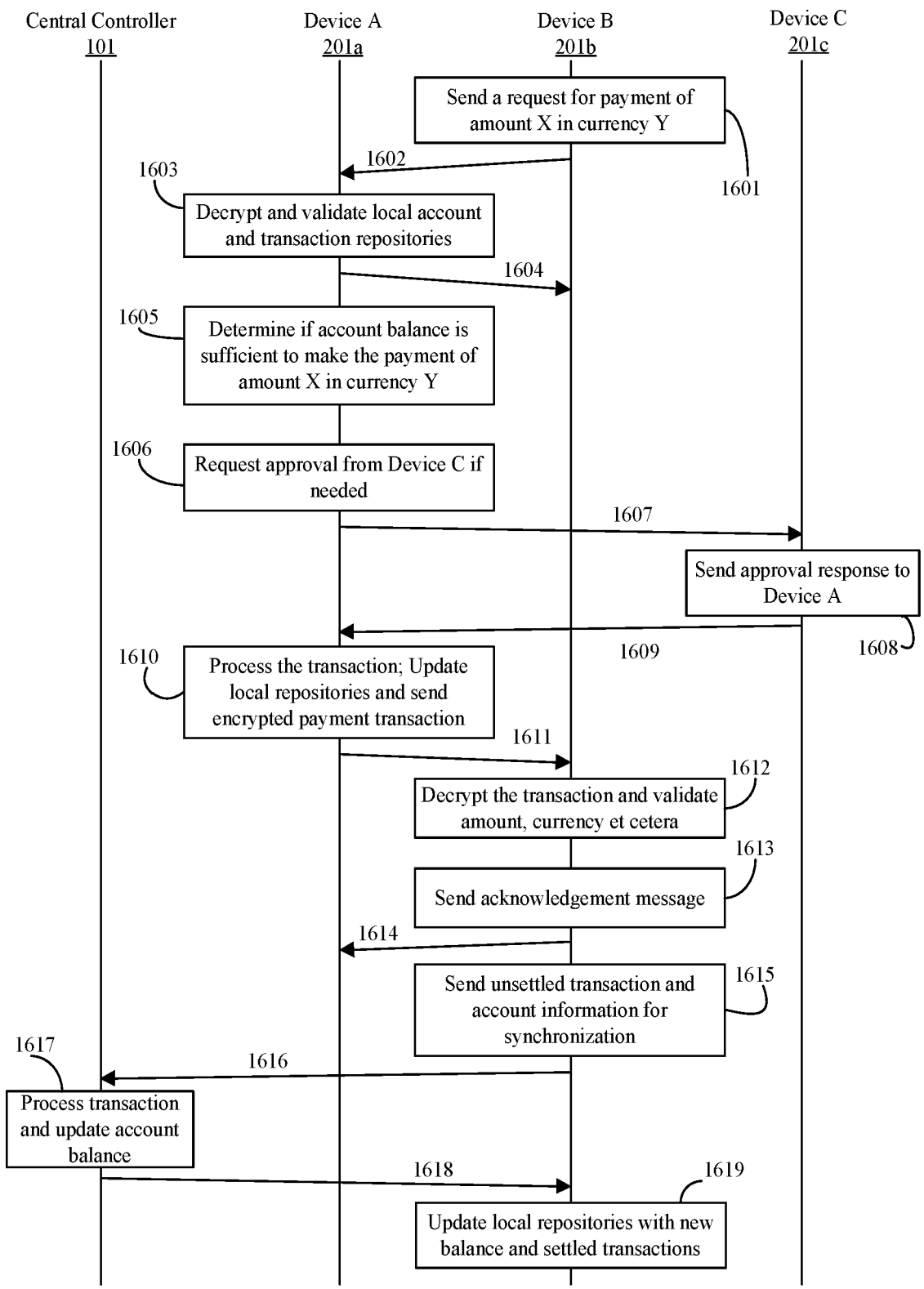
FIG. 16 shows exemplary timing diagram including the steps taken and the information messages exchanged among the device entities and the central controller for the processing of a transaction using an electronic currency by maintaining the security, authenticity and validity of the transaction elements.

FIG. 16 shows an example of a flow diagram of message exchange among device entities and central controller during the processing of a typical transaction. In step 1601, device entity 201b initiates a request for device entity 201a to make a payment of amount X in currency Y to device entity 201b. The message 1602 containing the transaction request is sent from device entity 201b to device entity 201a. The exact mechanism of peer-to-peer communication is dependent on the capability of the device entities. For example, device entity 201b can simply display an encoded transaction message on the display unit 215 of device 201b and the camera 210 on device 201a can be used to read the message. In still another method of message exchange, device 201b can establish a personal area network with device 201a using the personal area network interface 212 with Bluetooth capability on the respective devices. In step 1603, Transaction processing module 202 at device 201a upon receiving the message 1602 decrypts the local transaction repository and account repository stored in the local memory of the device 201a. TPM then performs computation to validate the hash value of the repositories and extracts the account balance information from the account repository 204 and unsettled credit transactions from the transactions repository 206 of device 201a.

TPM 202 also determines if the transaction approval is required from another device 201c if device 201c has been setup as the transaction approver for any transaction at device 201a. TPM at device 201a then sends an "approval request" message 1607 to the TPM at device 201c. TPM at device 201c receives the message and provides an approval for the transaction in step 1608. TPM 202 at device 201c then sends the "approval response" message 1609 to TPM 202 at device 201a.

TPM 202 at device 201a then processes the transaction, updates the account repository 204 with new available balance and stores the transaction in the transactions repository 206 in step 1610. Message 1611 is sent from TPM at device 201a to device 201b as an "initiate debit transaction request" message containing a debit transaction. In step 1612, TPM at device 201b validates the debit transaction and confirms the amount and currency of the transaction. In step 1613, TPM at device 201b prepares an acknowledgement message containing both initial credit transaction from step 1601 and the received debit transaction from step 1612 and then sends the acknowledgement message 1614 to the TPM at device 201a.

At a later time, in step 1615, device 201b connects to the central controller 101 via Internet and retrieves all unsettled transactions from local repository and sends them to the central controller in a "synchronization" message 1616 to the TPM 102 at central controller 101. TPM at central controller 101, then in step 1617 decrypts, validates and processes all transactions received in the message 1616, determines the final amount to credit or debit from the central account balance associated with the user identifier at device entity 201b. TPM at central controller 101 then sends the "synchronization complete" message 1618 to the TPM at device 201b. Finally in step 1619, TPM 202 at device 201b decrypts local repositories, stores the account balance and transaction information received from the central controller 101, hashes and encrypts the local repositories. The steps and messages shown in FIG. 16 are described in more detail along with additional steps and messages exchanged among multiple device entities and the central controller for securely and confidentially processing the transactions using an electronic currency by authenticating and validating the integrity of the transactions in some example scenarios in the following specification details.

An Example of Authentication, Integrity Validation and Confidentiality

Figure 5:
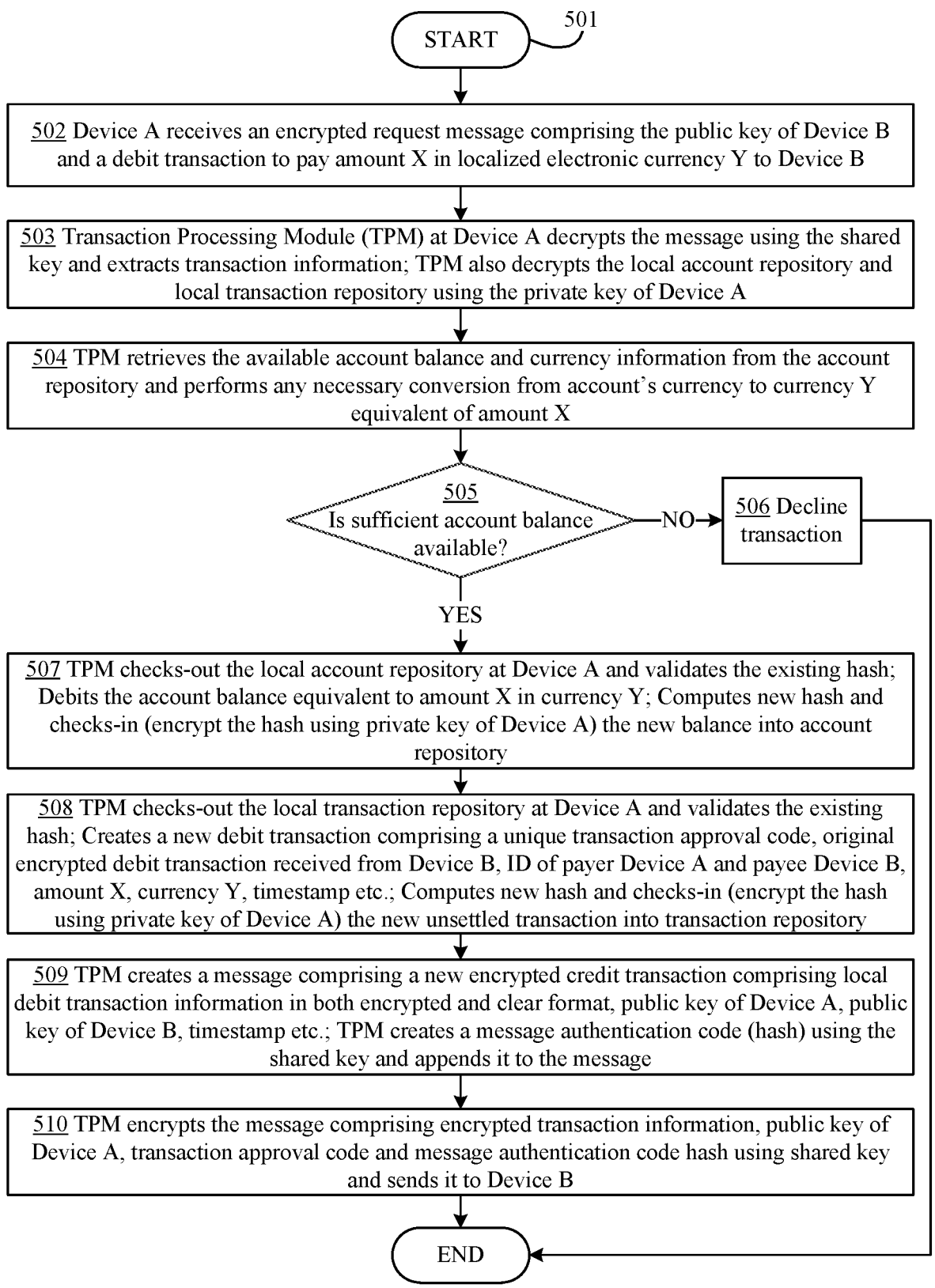
FIG. 5 shows message and event timing sequence initiated by one device entity (payer device) to pay a specific amount to a second device entity (payee device) in one embodiment.

FIG. 5 with continued reference to FIGS. 2, 4 and 13 shows the sequence of messages and events that take place among the payer(s), central controller and payee(s) in one embodiment. First, in step 502, payer device 201a receives a request from a payee device 201b to pay amount X in currency Y to the payee device entity 201b. The payment transaction request comprises the transaction elements shown in FIG. 13 including at least the amount X to pay in the electronic currency Y where Y represents a localized denomination of the electronic currency. Payer 201a then sends a request to the Transaction Processing Module (TPM) 202 in the device. The request message comprises the transaction information 1301 as shown in FIG. 13 and an encrypted value of a hash of the transaction information wherein hash is computed using a hash function and encrypted values is generated using the private key of the client application associated with the payee device B. Following formula shows by example a method to compute the hash value:

Hash Value=$H((K' \oplus opad)\|H((K' \oplus ipad)\|m))$

Where
- H is a cryptographic hash function such as SHA-2 (Secure Hash Algorithm 2) but other hash functions can also be used,
- K is the public key of the payee device B,
- m is the transaction information,
- K' is another secret key, derived from the original key K (by padding K to the right with extra zeroes to the input block size of the hash function, or by hashing K if it is longer than that block size),
- $\|$ denotes concatenation,
- $\oplus$ denotes exclusive or (XOR),
- opad is the outer padding (0x5c5c5c . . . 5c5c, one-block-long hexadecimal constant),
- and ipad is the inner padding (0x363636 . . . 3636, one-block-long hexadecimal constant).

The hash value can then be encrypted using AES (Advanced Encryption Standard) algorithm with a 256-bit key. The choice of the hash function, encryption algorithm and keys used for encryption and decryption etc. are determined by the Central Controller 101 and communicated to the client application on each client device 201 during the registration step 905 of FIG. 9 and during the synchronization step 1012 of FIG. 10. The choice of hashing algorithm and encryption algorithm used is not important for the implementation of the current invention and central controller can instruct the client applications (or Transaction Processing Module) on each device to use a different set of algorithms such as IDEA (International Data Encryption Algorithm) or CAST-128.

Further continuing with FIG. 5, in step 502, client application on the payer device 201a receives the encrypted request message from the payee device 201b for a credit transaction where credit transaction is for the client application on the payee device 201b to receive a payment from the client application on the payer device 201a. The messages can be transmitted between the two devices 201 using either online or offline peer-to-peer communication mechanisms. An example of online peer-to-peer communication mechanism is to use the connection established using Bluetooth interface. Still another example of online peer-to-peer communication mechanism is to use Near Field Communication (NFC) to establish a connection between two peer devices. An example of offline peer-to-peer communication mechanism could be to use the device display to show a QR (Quick Response) code or a sequence of QR codes containing the encrypted message on the sender device and to use the camera to read the QR codes and retrieve the data. Another example of offline peer-to-peer communication mechanism is to display an input field on the display of the receiving device and manually inputting the character string of the message displayed on the sender device.

In step 503, TPM then decrypts the account repository 204 and transaction repository 206 using the private key of device 201a as obtained during the signup process described later in this section in reference to FIG. 9. In steps 504 and 505, TPM 202 then retrieves the latest account information as stored in the account repository 204 and validates if the account balance is higher than the transaction amount X in currency Y. If the balance is low then the transaction is declined in step 506 and the device user is notified. If the sufficient balance is available in the account then, in step 507, TPM 202 updates the account information in the device by reducing the account balance equivalent to the amount X in currency Y. TPM 202 then computes a hash of the updated account information that includes timestamp of last update, account number, account balance, user identifier, device identifier etc.; checks-in the updated account information in the repository and again encrypts the account repository using its private key.

TPM 202 then decrypts the transaction repository 206 using its private key in step 508. A private key can be any data such as a key provided by central controller 101, a Personal Identification Number, a fingerprint, a retina scan of the eye, a facial recognition data etc. used to cryptographically encode the repository. In some cases TPM 202 may need the private key to be entered into the device using input devices 213 at the time of the transaction initiation. TPM 202 then checks-out the repository to make updates; creates a new transaction that includes the ID of device 201a, ID of device 201b as obtained in the payment request from device 201b, amount X, currency Y and timestamp et cetera with a unique transaction approval code. TPM 202 then computes a new hash value of the transaction details and checks-in the updated transaction information into the transaction repository 206. The unique transaction code, the unique device identifier or another random value can be used by the TPM as a salt for computing the hash value. The transaction is then marked as "pending settlement" and also entered in the transaction database 205.

TPM 202 further creates a globally unique identifier as the transaction approval code and validity time period and adds this information to the transaction information. It then computes the hash value of this information using a hash function such as SHA-2 or SHA-3. TPM 202 then encrypts this hash using the private key in step 509 and provides the encrypted digest of transaction to the payee device entity 201b using either a personal area network interface 212 or another mechanism such as QR Code (Quick Response code) for scanning as shown in step 510.

FIG. 13 with continued reference to FIG. 4 shows an exemplary embodiment of the transaction data structure 1301. A typical transaction data 1301 contains various elements and/or attributes such as transaction amount 1302, transaction timestamp 1303, payer device info 1304, a public key 1305 associated with the payer device 201a, payee device info 1306 and a public key 1307 associated with the payer device 201b. Furthermore, transaction data contains other information elements such as currency used for the transaction 1310, location of the transaction 1312. Transaction status 1313 depicts the state of the transaction which can be one of many possible states such as "initiated" by the payer 201a, "accepted" by the payee 201b, "approved" by the approver 201c, "validated" by the payee, "verified" by the central controller 101, "pending submission" to the central controller, "submitted" to the central controller 101, "pending settlement" at the central controller 101, "settled", "denied" or "processed" by the central controller 101 etc. Optionally, a transaction can also contain the approver device info 1308 and a public key 1309 associated with the approver device 201c. Each entity processing the transaction also updates the last update time 1314 for the transaction. Then all these information elements are used by the processing device entity to compute a hash value 1311.

The processing device uses a cryptographic key to compute encrypted hash value and includes the encrypted data 1315 in the transaction information. Transaction element 1316 denotes the type of transaction and can identify a debit transaction or credit transaction. Element 1317 stores the full transaction attributes of the parent transaction for a specific transaction. For example, the Transactions Processing Module (TPM) 202 at payer device may create a credit transaction while processing a debit transaction request received from the payee device. In that case, debit transaction received in the request will be the parent transaction of the generated credit transaction. TPM 202 in that case, will store the original debit transaction in the attribute 1317 for the credit transaction.

Similarly, when the payee device 201*b* receives a credit transaction request from the payer device 201*a* to accept the payment, the payee device 201*b* stores the encrypted credit transaction as the child transaction in attribute 1318 of the original debit transaction and updates the transaction in its local transactions repository 206.

Figure 6:
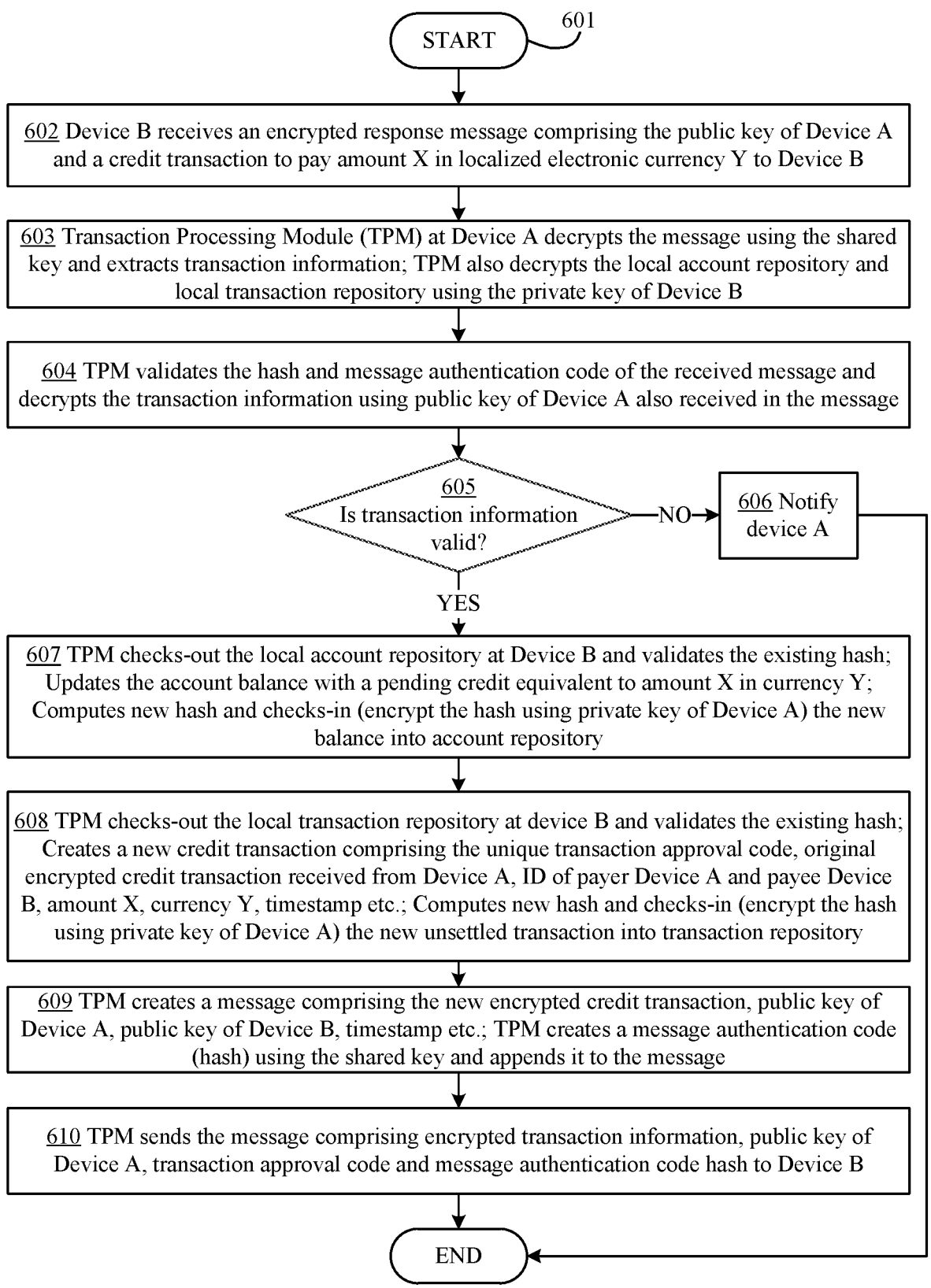
FIG. 6 shows message and event timing sequence initiated by the payee device entity (payer device) to confirm and complete the mutual transaction in one embodiment.

FIG. 6 with continued reference to FIGS. 2, 4, 5 and 13 shows the sequence of steps taken by the payee device 201*b* when it receives the transaction digest containing both encrypted and plain vanilla transaction information from the payer device 201*a*.

In preferred embodiment, transaction information received from payer device 201*a* requires validation from payee 201*b* as, for example, computing the hash value and verifying the encrypted transaction data.

In step 602, TPM 202 at device 201*b* receives the transaction information from payer 201*a* using one of the various methods such as receiving information over a Personal Area Network, scanning the QR code displayed on the payer device 201*a* etc. In step 603, TPM then decrypts the message using a shared key provided by the Central Controller 101. TPM also decrypts the account repository 204 and transaction repository 206 using the private key of device 201*b* as obtained during the signup process described later in this section in reference to FIG. 9. In step 604, TPM computes the hash value of the transaction information and also the encrypted hash value of the transaction and in step 605 matches it with the hash value and encrypted value present in the transaction information as provided by the device 201*a*.

If the hash value or the encrypted values do not match then, in step 606, payee device notifies the payer device and rejects the transaction. But if the values matches exactly then, in step 607, payee device 201*b* continues further processing of the transaction by checking out from the transaction repository, creating a new transaction record containing various information elements of transaction data structure 1301 that includes the received payment transaction (debit transaction) as a parent transaction attribute 1317 and storing the transaction in the transactions database 205 as an unsettled transaction and checks-in the new transaction record in the transaction repository. Transaction check-in process computes the hash of the contents of the transaction repository and some other information elements such as timestamp, device identifier et cetera and then finally encrypts the transaction repository using the private key of payee device 201*b*.

In step 608, TPM of device 201*b* checks-out the account repository and updates the account balance information to reflect the amount X received from the transaction in currency Y. But the new balance is not reflected into any transactions where device 201*b* may act as a payer device until the device synchronizes with the central controller 101 and transaction is settled by the central controller. In step 609, TPM 202 further creates a transaction 1301 with transaction status information marked as "pending settlement". It then computes the hash value of this information using a hash function such as SHA-2 or SHA-3. TPM 202 then encrypts this hash using the private key in step 609. In step 610, payee device sends an acknowledgement message containing the encrypted digest of transaction to the payer device entity 201*a*.

In some embodiments, the system and method may also use other mechanisms for encrypting and decrypting the repositories as well as checking-in and checking-out the information from repositories. The exact methods used for these steps are not important as long as the intent of the step follows the process described herein.

In some embodiments, the system and method may also be used in a partial or complete off-line communication. Off-line communication may be practiced using postal mail, electronic mail, phone, text message, facsimile or another off-line tool. An example of partial off-line embodiment may include a payer sending a postal mail to payee to provide the transaction information.

Figure 7:
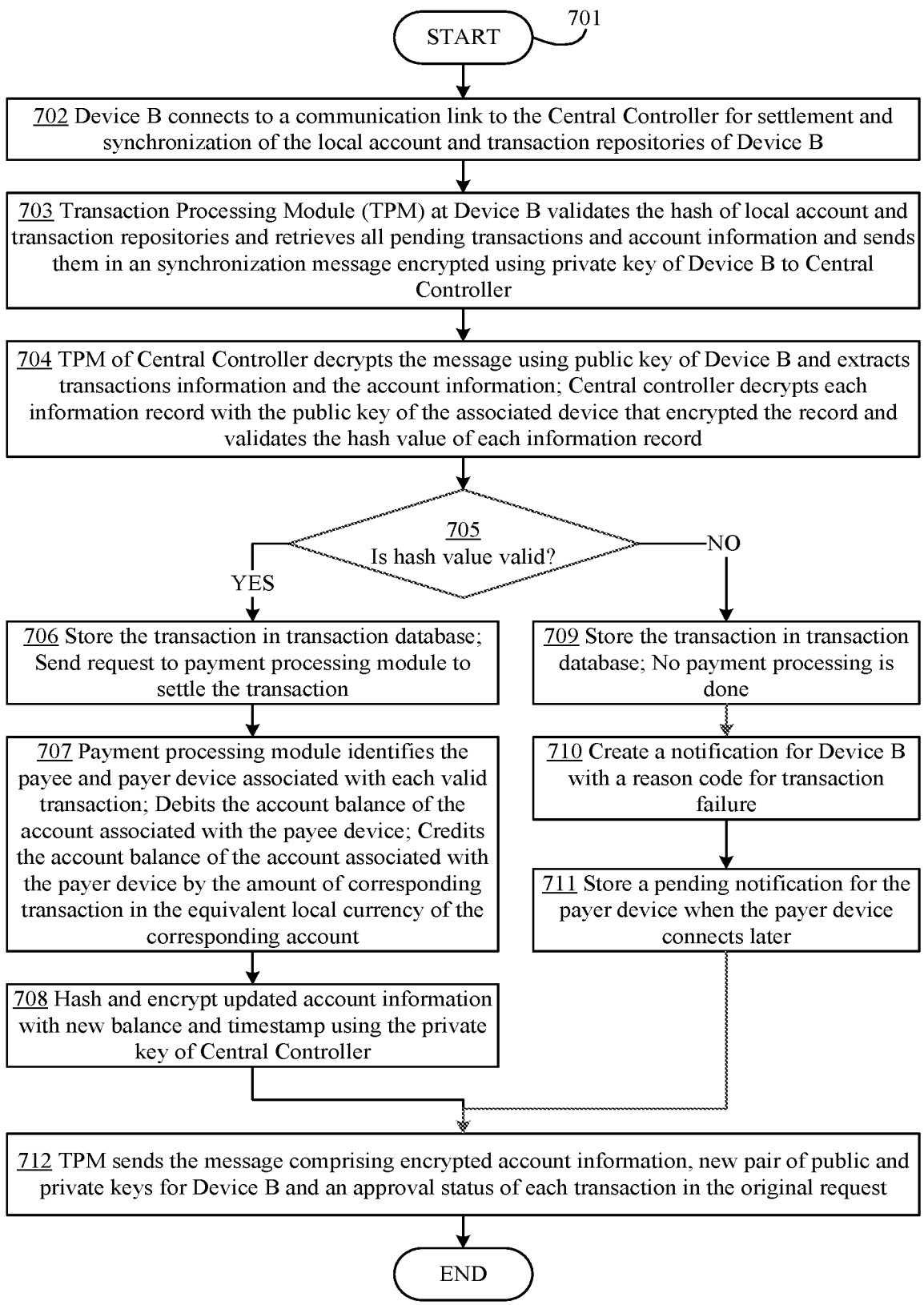
FIG. 7 shows a flow diagram of one embodiment of how a device submits transaction for settlement by the central controller.

One embodiment of this invention allows payee device 201*b* to connect to central controller 101 using Internet. Continuing with FIG. 7 with continued reference to FIGS. 1, 2, 3, 4, 5, 6 and 13, central controller 101 receives the transaction information from device 201*b* for settlement purpose. In step 702, device 201*b* establishes a communication link via Internet to the central controller using its network interface 211. In step 703, TPM 202 at device 201*b* decrypts the local transaction repository 206 and account repository 204 using the private key of the device 201*b*, validates the current stored hash values with the hash value computed using the decrypted information, creates an encrypted message comprising all the transaction in "pending settlement" status and its local account information where message is encrypted using the private key of device 201*b*, and then sends the encrypted message to the central controller 101 to synchronize its local repository information with the central controller.

In step 704, Transaction processing module (TPM) 102 at the central controller 101 decrypts the message using public key of device 201*b* and extracts transactions information and the account information. TPM 102 then decrypts each information record with the public key of the associated device that encrypted the record and validates the hash value of each information record in step 705. If the value is valid then, in step 706, TPM 102 stores the transaction in the transaction database 105 and sends the request for further payment processing to the payment processing module (PPM) 114. In step 707, PPM 114 carries out further steps to validate each transaction and compute a consolidated debit or credit amount for the account balance for the counterparties of each transaction where such steps are described in detail in FIG. 8. Continuing with step 708 in FIG. 7, central controller 101 computes the new hash value of the updated account information of device 201*b* using the private key of central controller 101 and then encrypts the account information using the private key of device 201*b*.

However, if the hash value of the transaction as determined in the step 705 earlier is invalid then in step 709, TPM 102 stores the transaction in the transaction database 105 and in step 710, it creates a pending notification for the counterparties of the transaction comprising payee device and payer device where notification consists of the transaction information 1301 with a transaction status marked as "invalid transaction". In step 711, the notification is stored in the notifications database 120 for a later delivery when the associated device connects with the central controller 101.

Figure 8:
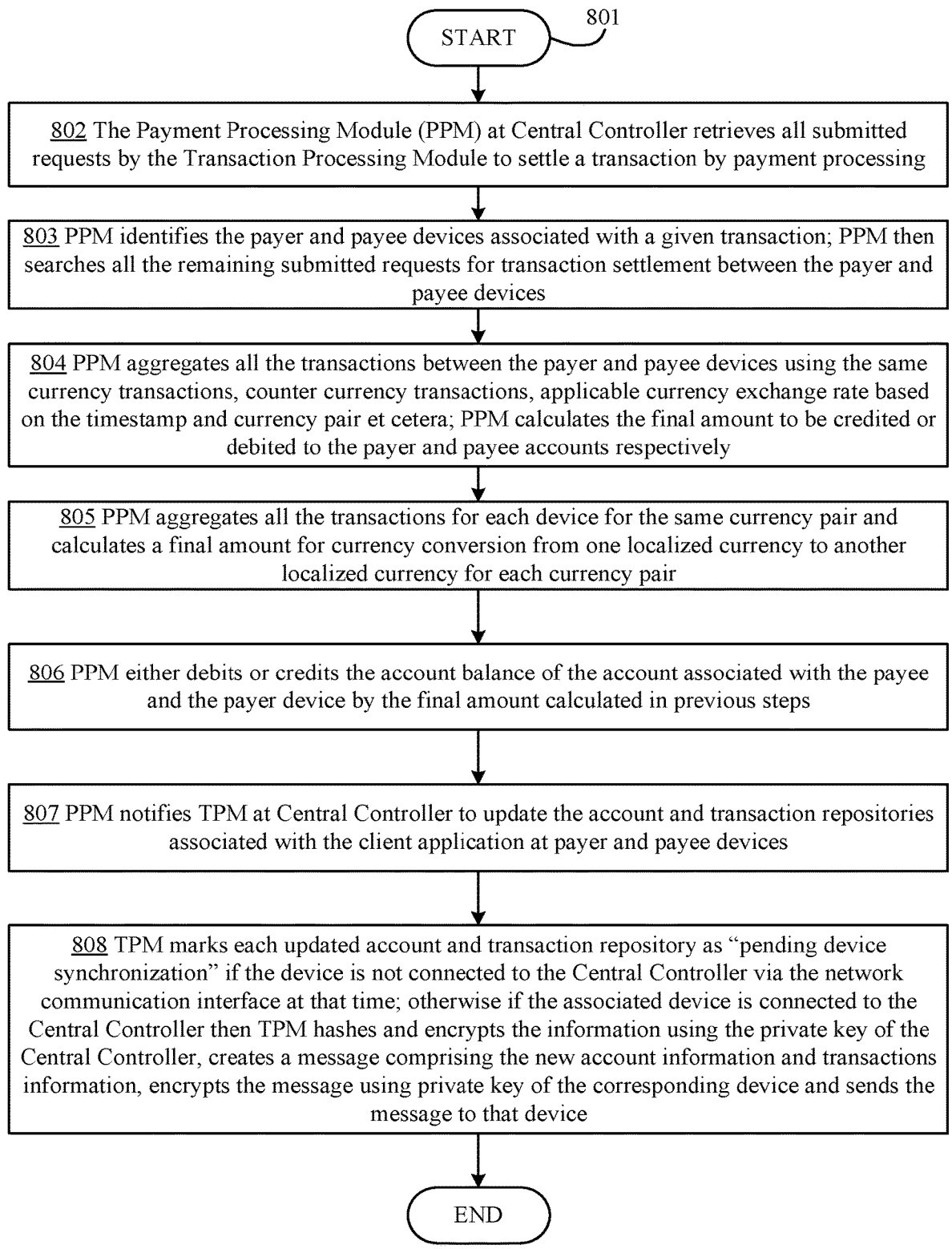
FIG. 8 illustrates a flow diagram of central controller processing the settlement request by aggregating and validating all submitted transaction between two device entities and transferring the net amount of money from one device account to another device account.

FIG. 8 shows by the way of a non-limiting example the steps taken by the Payment Processing Module (PPM) 114 at the central controller 101 to settle the transactions. In steps 802 and 803, Payment Processing Module (PPM) 114 retrieves all the requests received from the TPM of central controller 101. While processing each transaction in step 803, PPM identifies the payer and payee devices of a given transaction and then scans through all the pending transactions between those two devices. PPM then, in step 804, aggregates the transaction between those two devices and calculates a final amount preferably by each currency type that needs to be either withdrawn from or deposited to the account of device A and device B minus any commissions associated with the transaction processing service. Step 805 shows the currency conversion applied by the PPM to settle the transactions where the final transaction amount is in a currency with different localization information than the localization information of the currency available in the account. PPM then moves the final amount of money from one account to another in step 806 by taking into the account the currency information or submits the request to external entities to move the money via payment gateway interface of the central controller 101.

Further in step 807, PPM notifies the TPM to update all the repositories and accounts of the associated devices with transaction status as "settled" and update the account balances accordingly. TPM then waits, in step 808 for each device to synchronize with the central controller to update the local repositories on each device.

An Example of Device Signup and Synchronization Process

Figure 9:
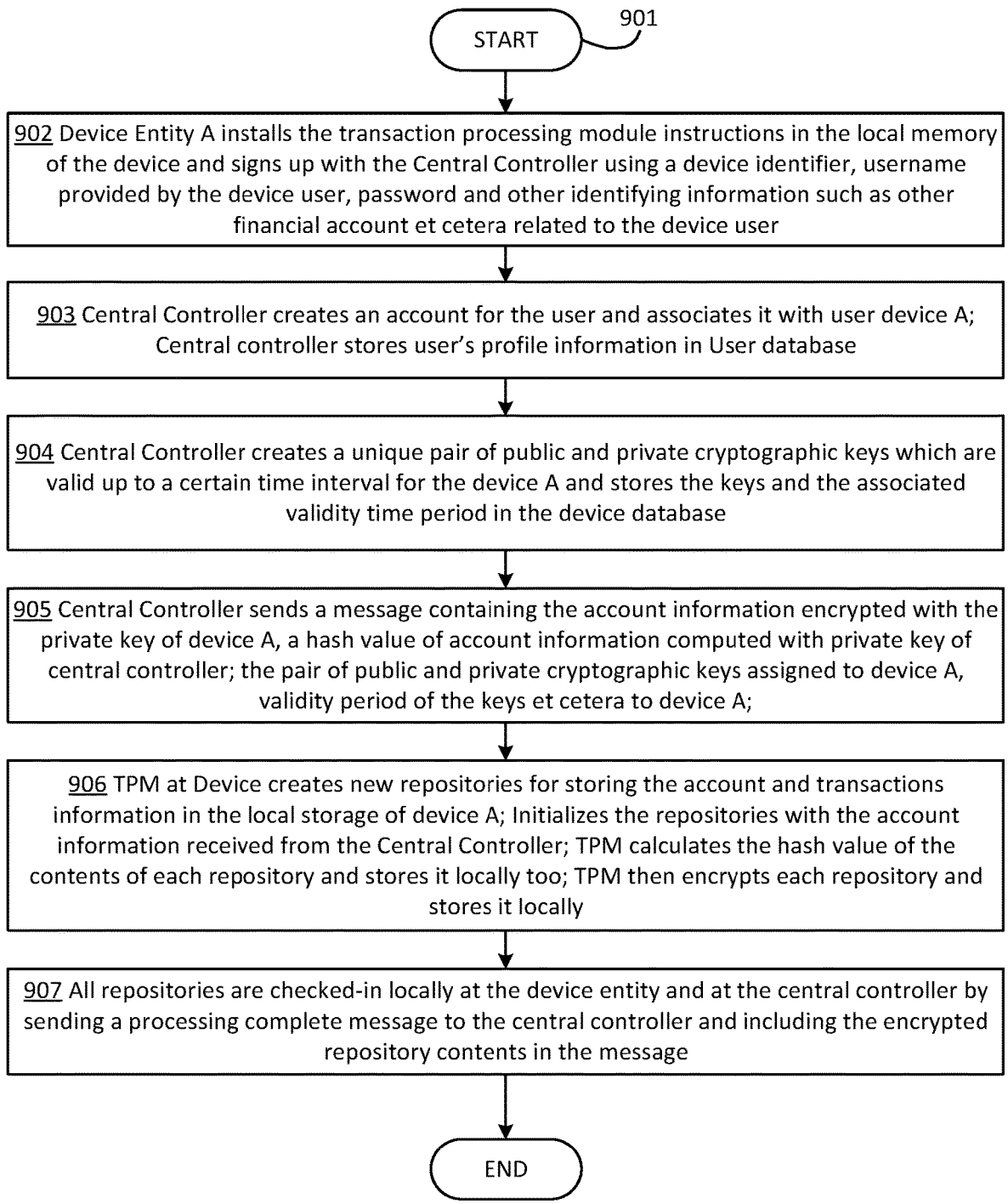
FIG. 9 illustrates exemplary flow diagram of a signup process where a new device entity registers itself with the central controller.

FIG. 9 shows by the way of non-limiting example only, steps taken by a new device entity to sign up for the transaction processing using the central controller 101. In step 902, device entity 201 installs the Transaction Processing Module 202 at the device. The transaction processing module 202 contacts the Central Controller 101 via Internet or any other remote communication link and sends information to identify the user of the device using a device identifier, user provided username, password and other identifying information such as other financial accounts etc. related to the device user. In step 903, central controller creates an account for the new device and stores the information provided by the TPM in the User Database and Device Database. Central controller 101, further generates public and private keys associated with the device based on the information received from the TPM of the device and store this information in the Device Database in step 904. In step 905, central controller sends the cryptographic keys to the TPM of the device.

The algorithm used to generate the cryptographic keys can be for example Rivest-Shamir-Adleman (RSA) or Diffie-Hellman (DH) or another symmetric or asymmetric cryptographic algorithm as determined by the central controller. Asymmetric cryptographic key pairs may be primarily provided by the central controller 101 to the device entities 201 for the transaction and message exchange among peer device entities as well and also to hash and encrypt certain information elements contained within the messages 1500. A symmetric key pair is used for exchange of messages between the central controller 101 and device entities 201 and also to hash and encrypt certain other information elements contained within the messages 1500. The cryptographic key pair, the hashing algorithm and the encryption algorithm used by the device entities 201 are determined and assigned by the central controller 101 and may also have a validity period associated with such elements. Thus the exact cryptographic key pair, the hashing algorithm and the encryption algorithm may change over time as determined by the central controller 101 and communicated to the device entities 201.

Further, in step 906, TPM at the device entity creates new account repository, a new transaction repository and a transaction database and synchronizes this information with the central controller 101. Finally, in step 907, TPM initializes and checks-in all repositories at the device with the latest information received from central controller and encrypts the repositories using the private key of the device as received in the step 905.

Figure 10:
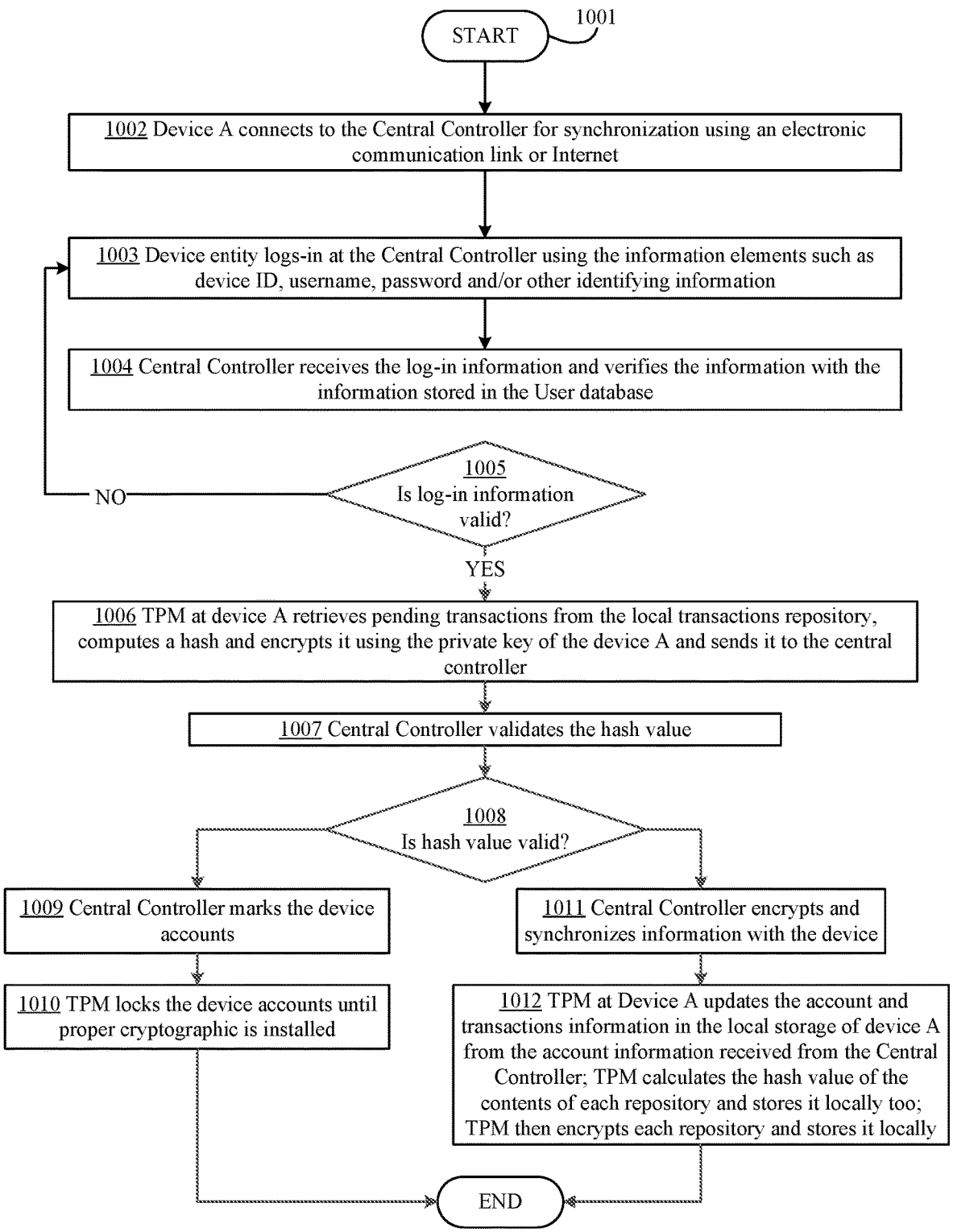
FIG. 10 shows one example of a flow diagram for device entity to synchronize its information with central controller, settle the transactions and update the account information on the device.

FIG. 10 shows an example of the steps taken by the central controller 101 and a device entity 201 during the synchronization of information with each other when a device is able to connect to the central controller 101 for transaction settlement and account updates. In step 1002, device entity 201 connects to the central controller 101 using a remote connection link such as Internet. After successful connection, in step 1003, device 201 sends the login information to the central controller 101 including username, password etc. In step 1004, central controller 101 verifies the user credentials with the information stored in User Database. If the information is not valid, then in step 1005, central controller 101 notifies the device 201 and lets the device 201 re-submit the correct information. If the information is correct then, in step 1006, TPM 202 at the device 201 retrieves any pending transactions, encrypts them using its private key and sends it to the central controller 101. Central controller 101 retrieves the public key of the device from the Device Database and uses it to verify the hash values of the transactions in step 1007. Step 1008 determines if the hash value matches with the hash value computed by the central controller. If the values don't match then Central Controller 101 logs this information in Device Database in step 1009, and also instructs TPM at the device to lock the account repository, account database and transaction repository at the device in step 1010. Once the TPM locks the local device repositories and the databases, device cannot execute any further transactions until it successfully synchronizes with the central controller again or central controller instructs the device TPM to reset the device information and repositories. If the hash values match and device is successfully validates, then in step 1011, Central Controller 101 encrypts and sends the updated account balance and settled transactions to the TPM at the device. TPM then in step 1012 updates the account balances available at the device and marks received transactions as settled. Finally TPM encrypts local device repositories and databases using the private key of the device.

An Example of Multifactor Authentication

Figure 11:
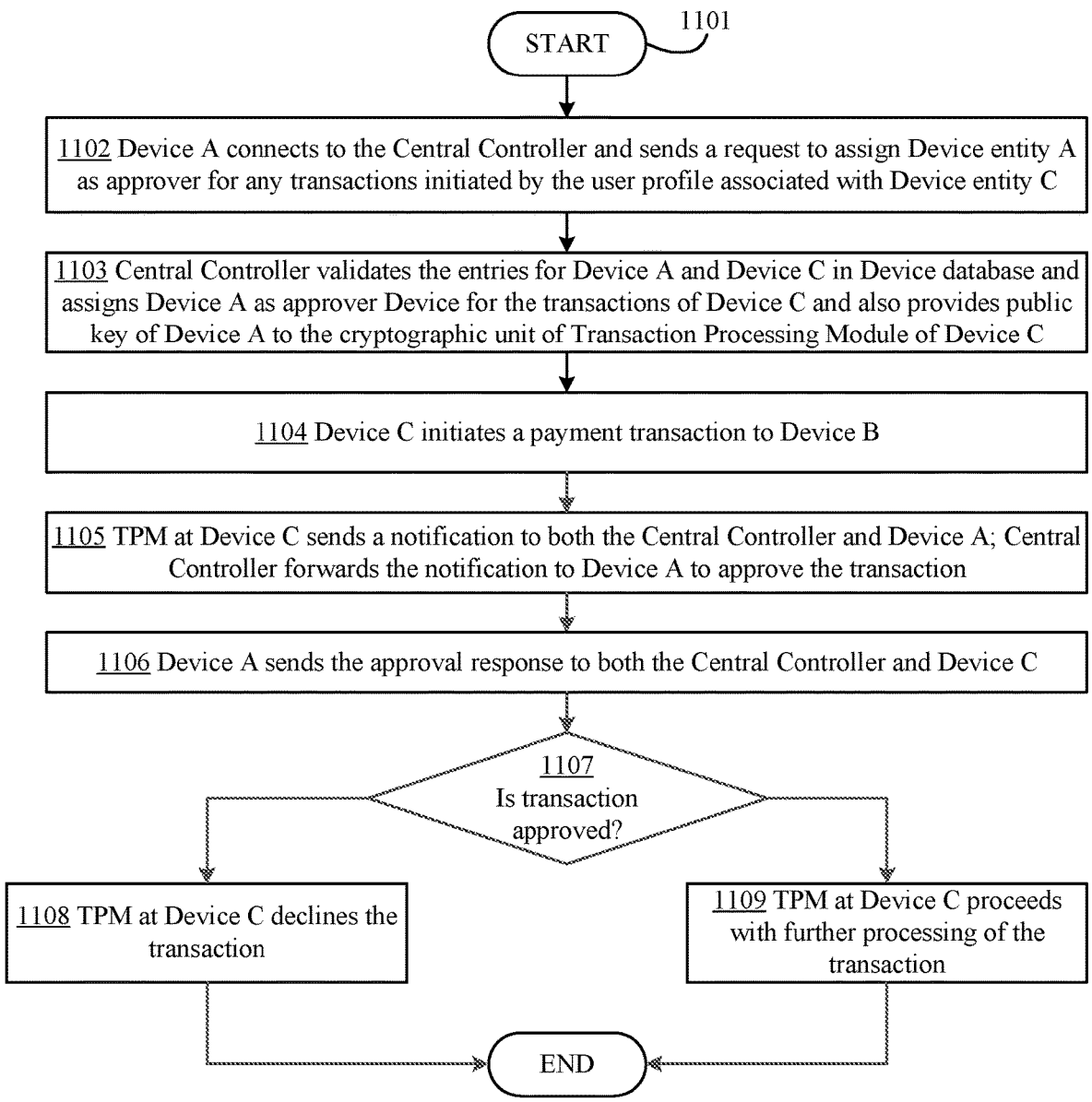
FIG. 11 shows the flow diagram of how a device entity can register itself as the approver of the transactions initiated by a second device where first device is the owner of accounts contained within the second device.

FIG. 11 shows an example of processing transactions using multi-factor authentication where a device can appoint itself or another device as the approver of the transactions associated with a third device. The device here can be the same entity as the first device itself or a separate device entity. Also the approver device can be module within the device entity itself such as fingerprint reader, facial recognition module, retina scan module etc. Or the approver device can be a remote device entity. The exact function and location of approver device is not important and is described here as an example only. In step 1102, device A connects to the central controller and sends a request to become the approver of all transactions for device C. Central controller, in step 1103, verifies the User Database and Device Database to identify the ownership information for devices and if it matches, then central controller updates the information for device C in the Device Database to request approval from device A for all transactions. Central controller also sends the public key of device A to device C to encrypt any transactions using that key instead of the public key of device C itself. Device C can then initiate a transaction in step 1104 and TPM at the device C sends notification to both the central controller and device A in step 1105. During the transaction processing, device A can approve the transaction as shown in step 1106. If the transaction is not approved by device A then TPM at device C declines the transaction in step 1108 and optionally notifies the device C. If the transaction is approved by device A then TPM at device C continues with further processing of the transaction in step 1109 and further follows the steps of processing a debit transaction as shown in FIG. 5 from step 502 through step 510.

Figure 12:
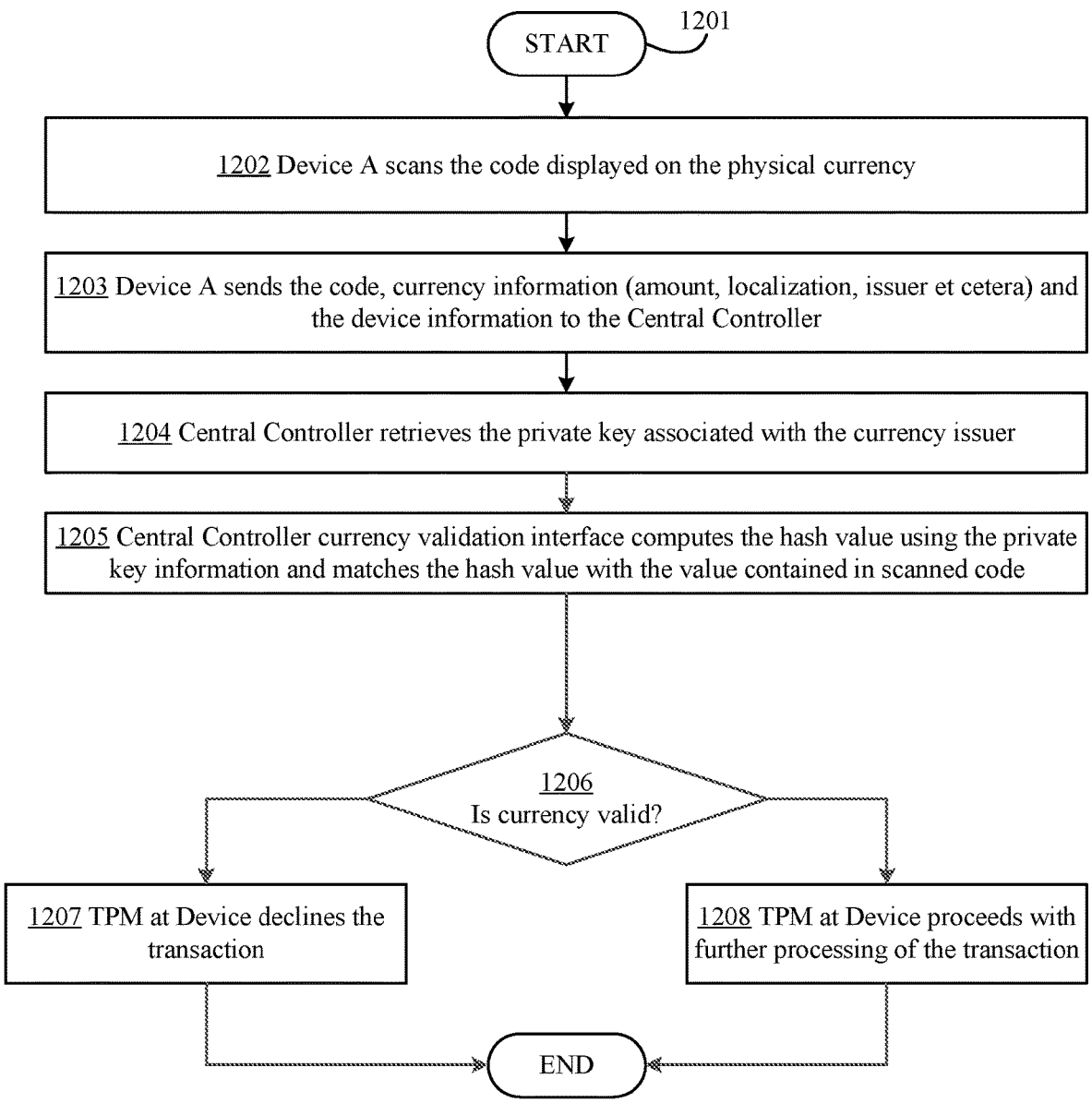
FIG. 12 illustrates exemplary information elements of a transaction itself.

In one embodiment, FIG. 12 shows the verification process for using the physical as well as electronic currency for the purpose of transactions. In step 1202, a device 201 scans the physical currency using one of the input devices 210 or 213 associated with the device. Device then sends the scanned information to the central controller 101 in step 1203. In step 1204, central controller 101 retrieves the private key associated with the currency type and the issuer of the currency from the currency information. In step 1205, central controller computes the hash value of currency information and matches it with the encrypted hash value contained in the currency information. Central controller notifies the device in step 1206 if it is a valid currency depending on the matching of information in previous step. If it is not a valid currency then TPM at the device rejects the transaction and in step 1207. If it is a valid currency then TPM at the device accepts the transaction and updates the account in step 1208 and synchronizes the updated account information with the central controller 101.

Figure 14:
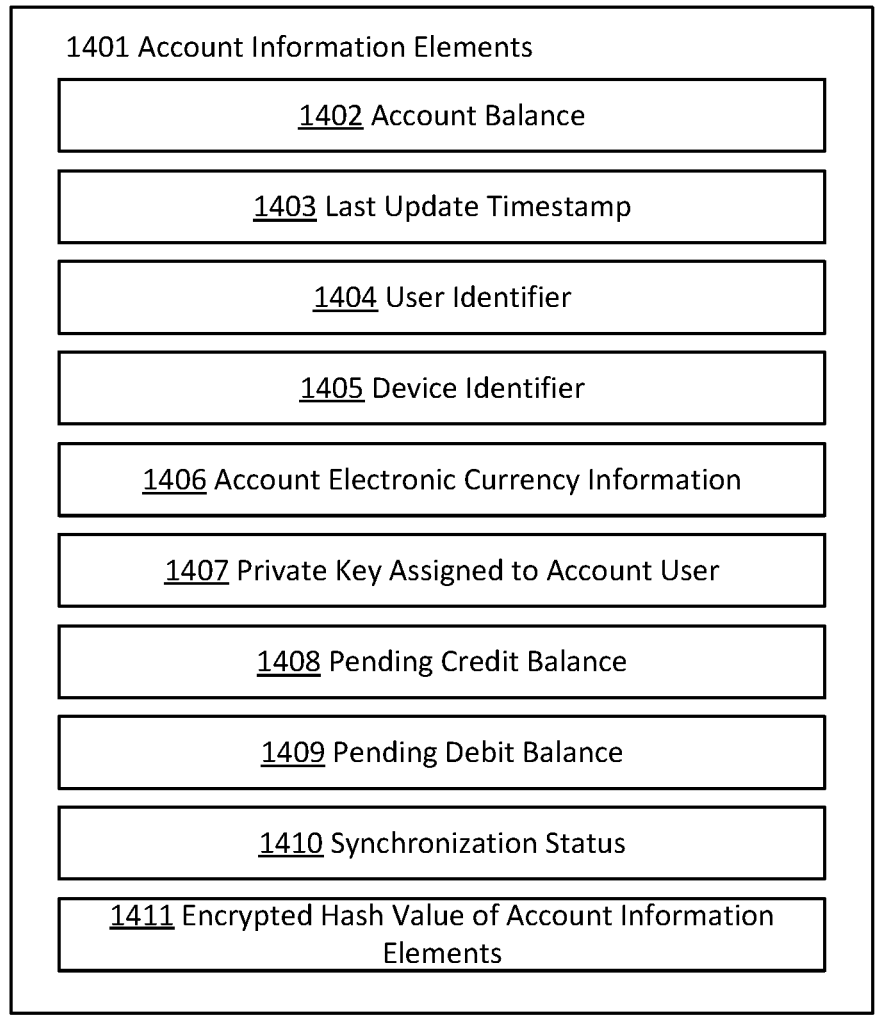
FIG. 14 shows exemplary information elements associated with account information stored locally at the device entities and at the central controller for each associated device entity.

FIG. 14 shows an exemplary embodiment of the information elements contained within the account information 1401 that is stored locally in the accounts repository 204 at the device entity 201 and in the accounts repository 106 and account database 107 at the central controller 101. For example, element 1402 is the currently available account balance for the user associated with the device entity, 1403 is the timestamp when the account information was last updated in the local repository or the local database, element 1404 contains the user identifier for the account owner, 1405 is the device identifier associated with the device where this account information is stored, 1406 contains the information about the localized electronic currency in which current account balance is denominated, 1407 is the private cryptographic key assigned to the account owner associated with the user identifier of element 1404. Further, element 1408 contains the aggregate value of all credit transactions that have been initiated from the device associated with the device identifier 1405 in the current localization of the electronic currency represented in element 1406. Similarly, element 1409 contains the aggregate value of all debit transactions that have been received by the device associated with the device identifier 1405 in the current localization of the electronic currency represented in element 1406. Element 1410 contains the synchronization status of the current account information. For example, the status can show "synchronized", "pending synchronization" et cetera where account information 1401 at a device 201 can be in "pending synchronization" status if a new transaction was processed by the associated device 201 after the last synchronization with the central controller 101. A hash value of the account information 1401 is computed by the transaction processing module (TPM) that uses a hash function, for example MD5, on the account information concatenated with a salt where salt can be a random number provided by the central controller 101. TPM then encrypts the hash value using an encryption algorithm such as AES (Advanced Encryption Standard) and stores this value in element 1411. These information elements are shown for an example in the preferred embodiment of the current invention. Still other information elements may be used in another embodiment of current invention.

Figure 15:
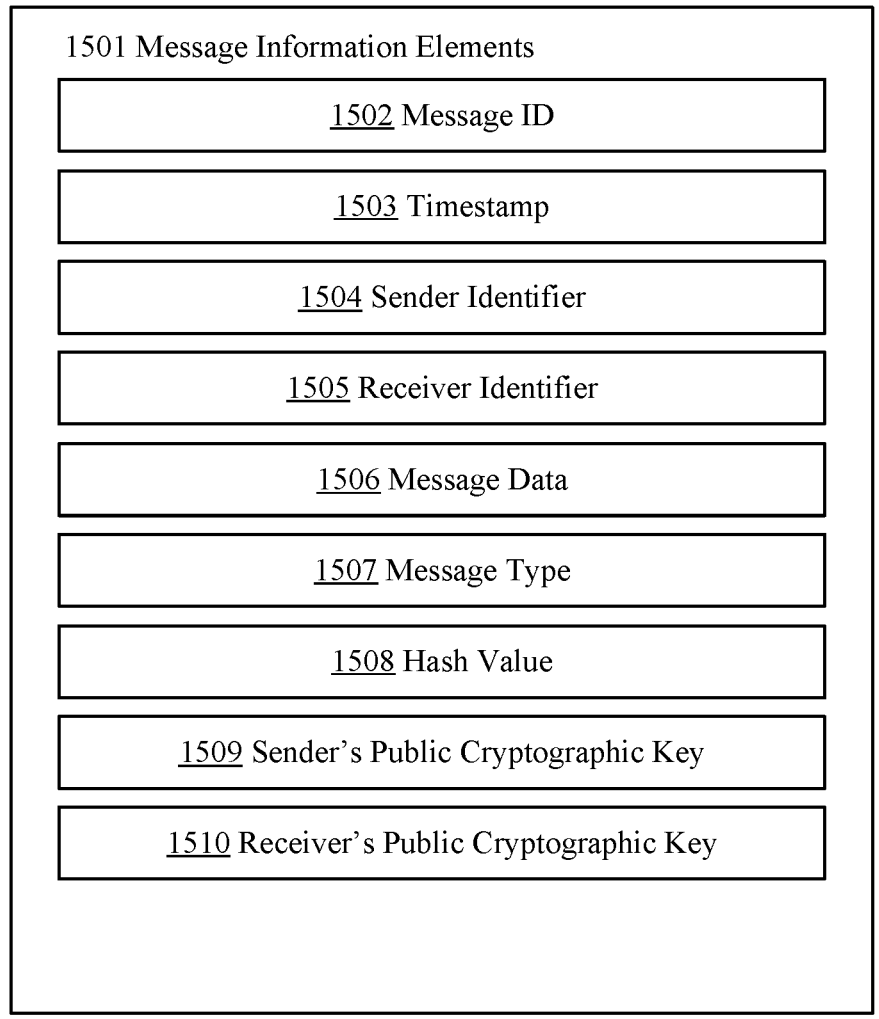
FIG. 15 shows exemplary information elements contained in information messages that is exchanged among device entities and the central controller.

FIG. 15 shows an example of the information elements contained within the message information 1501 that is exchanged among devices 201 and the central controller 101. 1502 is a unique identifier for the message exchanged between two device entities 201 or between the device entity 201 and the central controller 101. 1503 contains the timestamp when the message originated from the sender device 201 or the central controller 101. 1504 contains the user identifier of the sender and the device identifier of the associated sender device. Element 1505 contains the user identifier of the receiver and the device identifier of the associated receiver device. 1506 is the placeholder for payload or the actual data being transmitted within the message. Such data may represent, for example, transaction information 1301, account information 1401 or a combination thereof et cetera. 1507 identifies the type of message such as "initiate credit transaction request", "initiate debit transaction request", "acknowledgement", "synchronization", "synchronization complete", "transaction approval request", "transaction approval response" et cetera. 1508 contains the hash value of the message information elements that is computed using all the other information elements of the message. 1509 contains the public cryptographic key of the sender device 201a and 1510 contains the public cryptographic key of the receiver device 201b. The hash value of the message is then encrypted using the private cryptographic key of the sender or the private key of the central controller depending on the type of message conveyed in the element 1507 and the sender device information in the element 1504.

While certain embodiments of the inventions have been described, these embodiments have been presented by the way of example only, and are not intended to limit the scope of the disclosure. Indeed, the novel methods and system described herein may be embodied in a variety of other forms; furthermore, various omissions, substitutions and changes in the form of the methods and systems herein may be made without departing from the spirit of the disclosure. The accompanying claims and their equivalents are intended to cover such forms or modifications as would fall within the scope and spirit of the inventions.

The skilled person will be aware of a range of possible modifications of the various embodiments described above and many other possible applications of the present invention may be reduced to practice. Therefore, the present invention is not limited by the specific embodiments described above. Accordingly, the present invention is defined by the claims and their equivalents.

What is claimed is:

1. A system for processing and managing electronic transactions using an electronic currency, comprising:
   a network-connected central controller computer comprising a memory and a processor and further comprising a programmable code stored in the memory, the programmable code when executed by the processor cause the processor to:
   receive a plurality of registrations from a plurality of users of a plurality of client devices over a network;
   create a plurality of unique user identifiers for the plurality of users wherein a first unique user identifier of the plurality of unique user identifiers is associated with an account for a first user of the plurality of users;

create a plurality of unique device identifiers for the plurality of client devices wherein a first unique device identifier of the plurality of unique device identifiers is associated with a first client device of the plurality of client devices and further wherein the first unique user identifier is associated with at least one unique device identifier of the plurality of unique device identifiers;

create and store a unique pair of public and private cryptographic keys associated with the first unique user identifier;

send the unique pair of public and private cryptographic keys to each client device identified using the unique device identifiers associated with the first unique user identifier;

create a single pair of global public and private cryptographic transaction keys;

send the global public cryptographic transaction key to each client device of the plurality of client devices;

create a user profile associated with the first unique user identifier, the user profile comprising a plurality of information elements further wherein the plurality of information elements are encrypted using the private cryptographic key associated with the first unique user identifier and the user profile is encrypted using the global private cryptographic transaction key;

associate a transaction repository with the first unique user identifier wherein the transaction repository is encrypted using the global private cryptographic transaction key further wherein the transaction repository stores a plurality of encrypted transactions comprising a plurality of transaction elements;

receive, from an external entity, information of available funds in denomination of a plurality of localization information elements comprised within the electronic currency wherein the information is processed to store a plurality of conversion factors to convert an amount from a denomination in a first localization information element of the plurality of localization information elements to a denomination in a second localization information element of the plurality of localization information elements;

receive the plurality of encrypted transactions from the plurality of client devices wherein a first encrypted transaction of the plurality of encrypted transactions is encrypted using the private cryptographic key associated with the first unique user identifier;

create a general transaction repository comprising the plurality of transactions received from the plurality of client devices;

decrypt the plurality of encrypted transactions wherein the first encrypted transaction of the plurality of encrypted transactions is decrypted by applying a set of cryptographic keys comprising the public cryptographic key associated with the first unique user identifier and the global public cryptographic key;

convert a transaction amount comprised within the plurality of transaction elements of each decrypted transaction of the plurality of decrypted transactions by applying a conversion factor for converting the transaction amount in the electronic currency denomination based on the localization information comprised within the electronic currency and the localization information comprised within the decrypted transaction;

compute a consolidated debit or credit amount by combining, based on the plurality of transaction elements comprised within each decrypted transaction, the converted transaction amount for at least a portion of the plurality of decrypted transactions between the first client device and a second client device of the plurality of client devices;

convert the consolidated debit or credit amount by applying a conversion factor based on the localization information comprised within the electronic currency and a localization element comprised within the user profile associated with the first unique user identifier;

update an account balance information element by applying the consolidated debit or credit amount comprised within the encrypted user profile associated with the first unique user identifier; and encrypt the transaction repository using the global private cryptographic transaction key.

2. The system of claim 1, wherein the programmable code when further executed by the processor cause the processor to maintain the public and private cryptographic key pair assigned to the first client device wherein the cryptographic keys remaining valid for a predetermined time interval.

3. The system of claim 1, wherein the programmable code when further executed by the processor cause the processor to:

receive an assignment from the first client device, wherein the assignment assigning a second client device, of the plurality of client devices, as an approver of a first encrypted transaction received from the first client device;

send a message to the second client device to request an approval response associated with the first encrypted transaction;

receive a message from the second client device comprising the approval response;

process the first encrypted transaction based on the approval response from the second client device.

4. The system of claim 1, wherein the electronic currency is localizable by modifying the localization information elements comprised within the electronic currency.

5. The system of claim 1, wherein the programmable code when further executed by the processor cause the processor to:

receive, from the first client device, an encrypted message;

responsive to the encrypted message:

validate a cryptographic hash value of the electronic currency associated with a first encrypted transaction of the plurality of encrypted transactions wherein transactions are encrypted using the private cryptographic key associated with the first unique user identifier;

determine an authenticity of the value using the cryptographic hash value and the private cryptographic key associated with a unique user identifier associated with a second client device identifier comprised within the plurality of transaction elements of the first encrypted transaction.

6. The system of claim 1, wherein the programmable code when further executed by the processor cause the processor to:

receive a synchronization message from the first client device to settle a first encrypted transaction marked as an unsettled transaction in a local storage associated with the first client device;

authenticate the first client device;

validate at least one or more encrypted transactions received from the first client device;

settle the first encrypted transaction;

update the account information of the first unique user identifier associated with the first client device;

compute a hash value using a cryptographic key;

attach the hash value to the account information;

encrypt the account information using the private cryptographic key associated with the first unique user identifier;

send the account information to the first client device.

7. The system of claim 1, wherein the programmable code when further executed by the processor cause the processor to send a message to the first client device to update local account information and local transactions information stored in a local storage of the first client device.

8. The system of claim 1, wherein the programmable code when further executed by the processor cause the processor to;

maintain a digital signature associated with an issuing authority, wherein the issuing authority is associated with the electronic currency;

validate the cryptographic hash value of the electronic currency and determine the authenticity of the electronic currency using cryptographic hash value and the digital signature.

\* \* \* \* \*